Inventor
GILBERT L. HOBROUGH
by: Cavanagh & Norman

Aug. 18, 1964     G. L. HOBROUGH     3,145,303
AUTOMATIC STEREOPLOTTING SYSTEM AND METHOD
Filed Aug. 7, 1961     19 Sheets-Sheet 3

*Inventor*
GILBERT L. HOBROUGH by: *Cavanagh & Norman*

Aug. 18, 1964  G. L. HOBROUGH  3,145,303
AUTOMATIC STEREOPLOTTING SYSTEM AND METHOD
Filed Aug. 7, 1961  19 Sheets-Sheet 5

*Inventor*
GILBERT L. HOBROUGH by: *Cavanagh & Norman.*

Aug. 18, 1964  G. L. HOBROUGH  3,145,303
AUTOMATIC STEREOPLOTTING SYSTEM AND METHOD
Filed Aug. 7, 1961  19 Sheets-Sheet 7

*Inventor*

GILBERT L. HOBROUGH by: Cavanagh & Norman.

Aug. 18, 1964    G. L. HOBROUGH    3,145,303
AUTOMATIC STEREOPLOTTING SYSTEM AND METHOD
Filed Aug. 7, 1961    19 Sheets-Sheet 8

*Inventor*

GILBERT L. HOBROUGH by: *Cavanagh & Norman*

Aug. 18, 1964  G. L. HOBROUGH  3,145,303
AUTOMATIC STEREOPLOTTING SYSTEM AND METHOD
Filed Aug. 7, 1961  19 Sheets-Sheet 9

Inventor
GILBERT L. HOBROUGH by: Cavanagh & Norman

Aug. 18, 1964  G. L. HOBROUGH  3,145,303
AUTOMATIC STEREOPLOTTING SYSTEM AND METHOD
Filed Aug. 7, 1961  19 Sheets-Sheet 12

Inventor
GILBERT L. HOBROUGH
by: Cavanagh & Norman

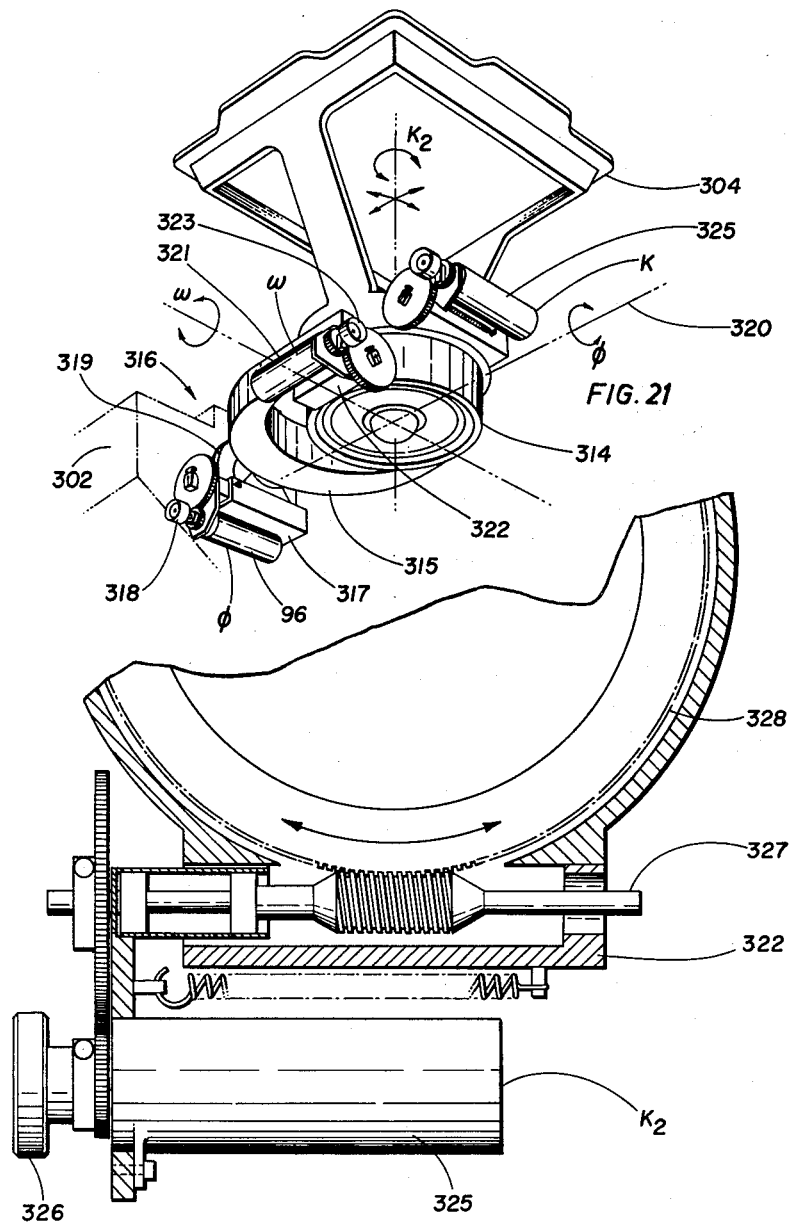

Aug. 18, 1964  G. L. HOBROUGH  3,145,303
AUTOMATIC STEREOPLOTTING SYSTEM AND METHOD
Filed Aug. 7, 1961  19 Sheets-Sheet 15

Inventor
GILBERT L. HOBROUGH
by: Cavanagh & Norman

Inventor
GILBERT L. HOBROUGH by: Cavanagh & Norman

United States Patent Office 3,145,303
Patented Aug. 18, 1964

3,145,303
AUTOMATIC STEREOPLOTTING SYSTEM
AND METHOD
Gilbert Louis Hobrough, Scarborough, Ontario, Canada, assignor to Hunting Survey Corporation Limited
Filed Aug. 7, 1961, Ser. No. 129,583
19 Claims. (Cl. 250—220)

This invention relates to an automatic stereo plotting system and method for extracting and interpreting image information from stereo photographic pairs and in which substantially eliminates human errors in stereoplotting and automatic contouring photogrammetric techniques in the making of maps and the like.

This application is a continuation-in-part of application Serial No. 77,768, filed December 12, 1960, lapsed after the filing of the instant application and assigned to the same assignee as the present application.

The photogrammetric plotting machine operator must develop unusual skills, many of which are difficult to analyze and define. This is due to the intimate mechanical and interpreting characteristics of the operations performed. The systems and methods of the invention are generally directed to the release of the operator from the mechanical characteristics of the functions performed by the operator and especially in relation to the operations of sensing and clearing parallax of the stereo images whereby the operator may better concentrate his efforts on interpretative functions.

The development of automatic mechanical functions of assistance in stereoplotting is exemplified in some detail in a number of prior applications of the present inventor and assigned to the same assignee as the instant application and issued by the United States Patent Office under date of December 13, 1960, as numbers: 2,964,639, 2,964,642, 2,964,643 and 2,964,644.

While said prior applications outline both generally and specifically ways and means for accomplishing one or more operations to substitute for efforts of manual and interpretative functions of the operator, investigation of the various techniques has led to the overall organization of substantially automatic operating functions derived from improvements and simplifications of the methods, systems and devices of the prior applications.

It is accordingly an object of the invention to provide a system and method for sensing parallax by detecting the time difference between the image signals from corresponding parts of each image in such manner as to eliminate magnitude variations, thus to render the system insensitive to change in either the average density or contrast of the stereo images.

It is another object of the invention to provide a system and method as before in which the image signals are unresponsive to image configurations such as lines, circles, and the like and wherein the examination or scanning velocity varies widely thereby to render this system responsive to both fine and coarse image detail.

It is a further object of the invention to provide a substantially automatic stereo photogrammetric system and method in which image signals from a stereographic pair may be translated into as many as up to five separate data signals comprising: an image correlating signal, an X coordinate parallax signal, a Y coordinate parallax signal, a terrain slope magnitude signal, a terrain slope direction signal, a scanning pattern size signal being a function of the terrain slope magnitude signal, and a terrain elevation signal being a function of an X parallax signal for constant Y parallax signal.

It is a further object of the invention to provide a system and method for plotting topography automatically either by profiling or contouring principles and in which the terrain conditions control automatically the speed at which profiles or contours are traced.

Having regard to the foregoing, the invention generally contemplates improvements in a stereo image examining system by means of which two image information signals are developed by simultaneously scanning the images about a scanning axis. The signals are processed to obtain a registration error signal responsive in magnitude and direction to X and Y coordinate parallax accordingly in the intersection of the images by the scanning axes. A plotting table supports X and Y coordinate bar mechanism freely traversable thereover and including drive motors therefor operating responsive to X and Y coordination in the registration error signal whereby a viewing platen supported by a carriage moved by the coordinate bars may be moved over the plotting table responsive to the information in the error signal. The viewing platen means is movable in the Z coordinate direction being likewise motor driven and can be caused to move vertically in response to X parallax whereby the viewing platen will achieve a position over the plotting table to effect profiling automatically at a selected X coordinate station along a Y coordinate direction. In addition the viewing platen may be assumed to be at a fixed height corresponding to a contour of elevation and the parallax information utilized to drive the X and Y coordinate bars to effect tracing of a contour at said elevation.

In addition, the invention contemplates the automatic orientation of the stereo images by supporting them each on three axes about which they may be adjusted in K, phi and omega functions having drive means for at least one of each and whereby a Y parallax signal may be selectably employed to drive each of the motors in turn to achieve true orientation without requiring visual inspection by the operator.

The invention also without employing any limitation on the foregoing or deriving limitation therefrom, contemplates an improvement in a stereoplotting system in which two stereo images are examined and interpreted on a plotting table with the aid of viewing platen means: of cathode ray tube means having screen structure serving as the viewing platen means and adapted to generate a scanning pattern for each of the images. A noise generator and a fixed frequency source combined to provide a scanning generator adapted to provide a specially desired scanning pattern for examining the images at the viewing platen means. A photo-electric cell associated with each image and including an optical system defines a scanning axis for each image and is adapted to generate an electrical signal responsive to the image information scan. A registration discriminator multiplies and cross-correlates the signals so provided to develop a registration error signal containing both magnitude and directional information concerning parallax. X and Y drive signals are generated responsive to amplitude and directional information in said error signal. The viewing platen means may then be moved over the plotting table in X and Y coordinate directions responsive to X and Y coordinate drive signals. In addition, the viewing platen means may also be moved in a Z coordinate direction responsive to X parallax while restricting X coordinate motion thus to achieve a profiling function.

Other objects of the invention will be apparent from a study of the following specification taken into conjunction with the accompanying drawings.

Figure 1:
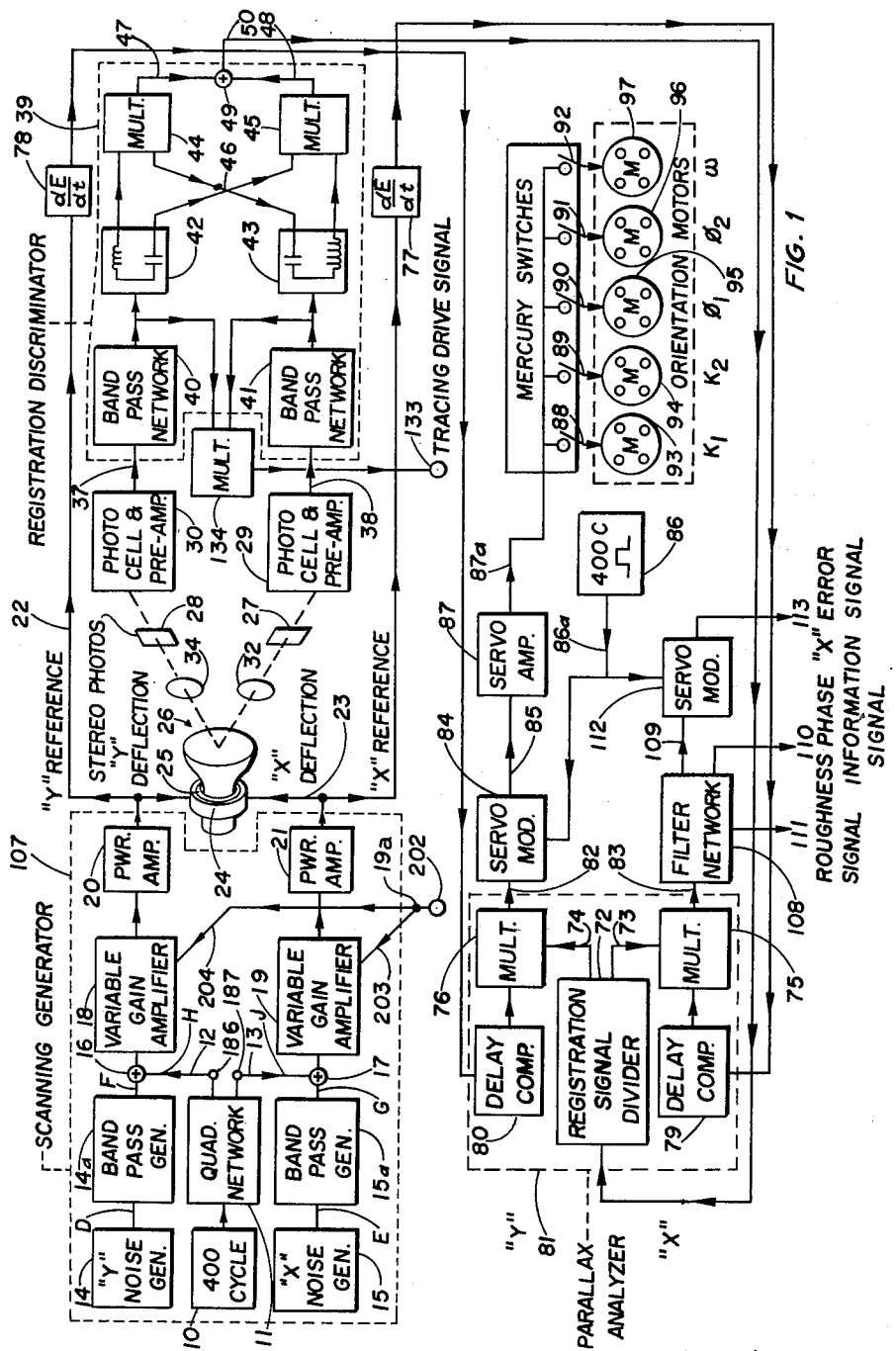
FIGURE 1 is a partial electrical schematic of the electronic components of the system of the invention which may be applied to existing stereo plotting devices.
Figure 2:
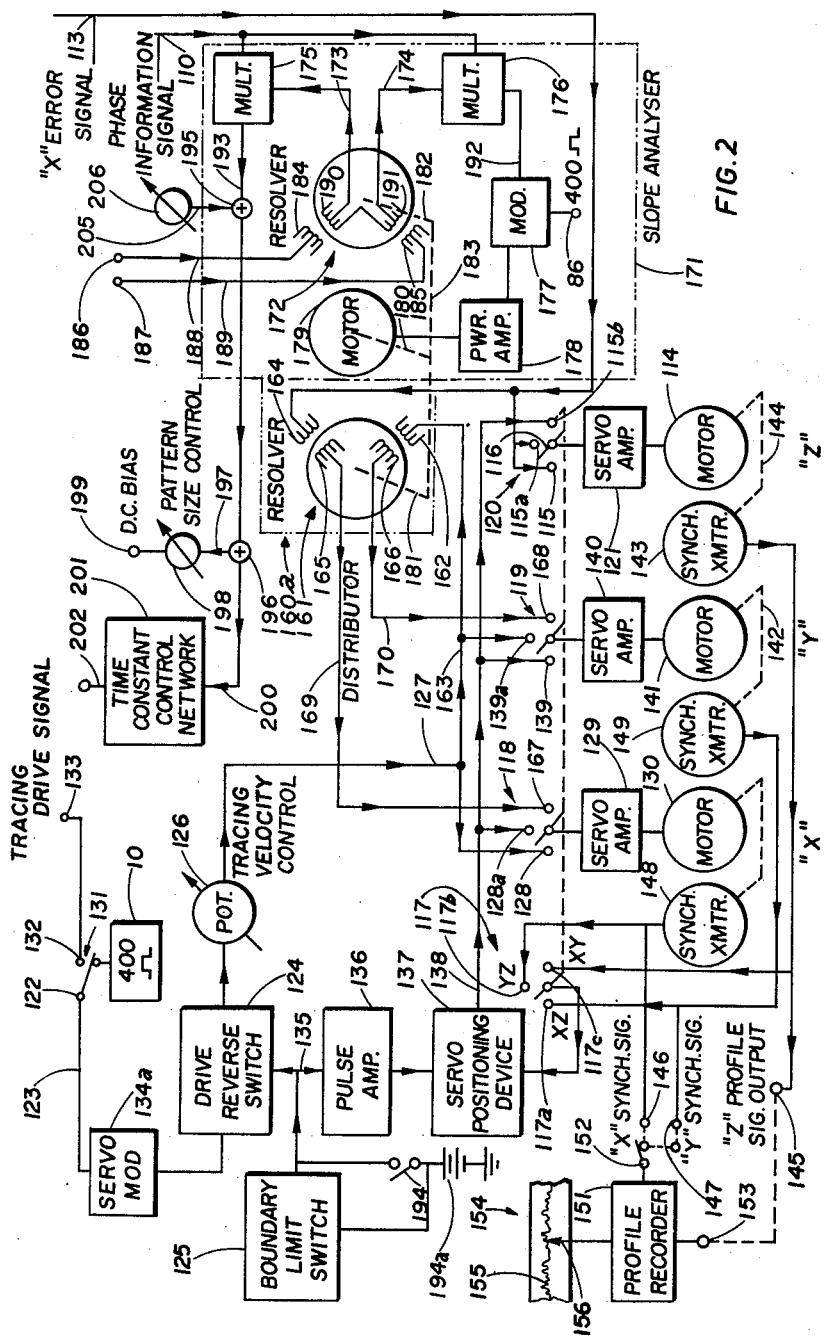
FIGURE 2 is essentially a continuation of FIGURE 1.
Figure 6:
Figure 7:
Figure 8:
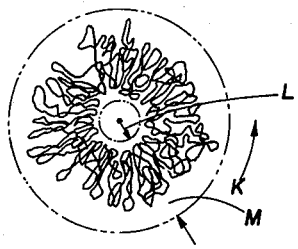
Figure 9:
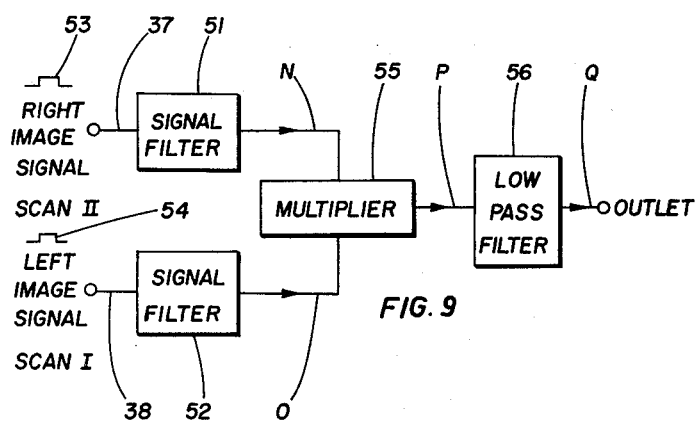
Figure 10:
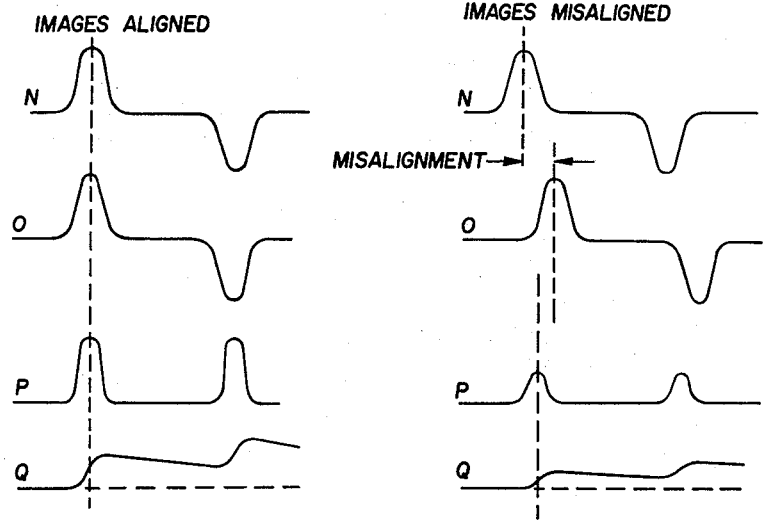
Figure 11:
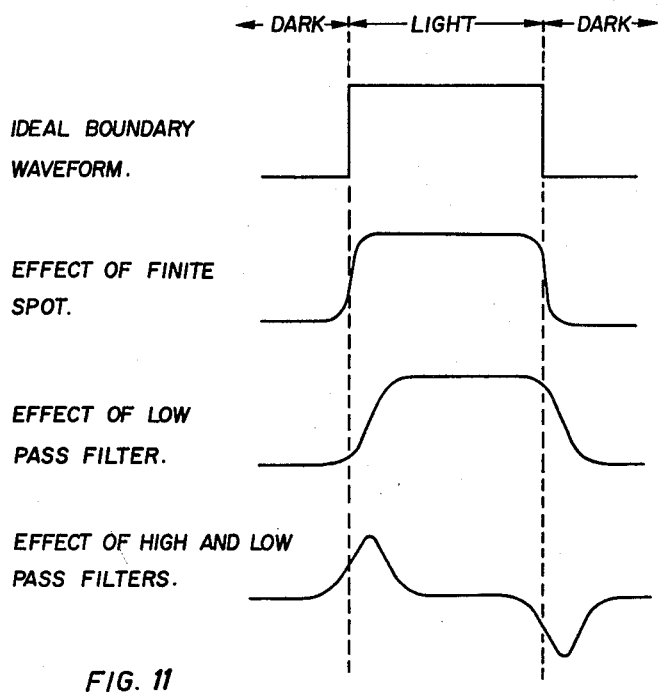
Figure 12:
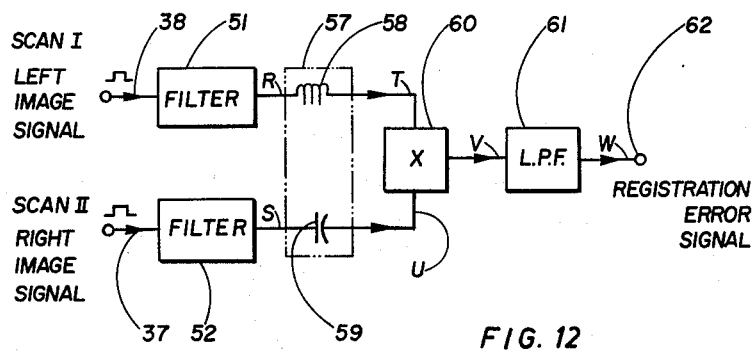
Figure 13:
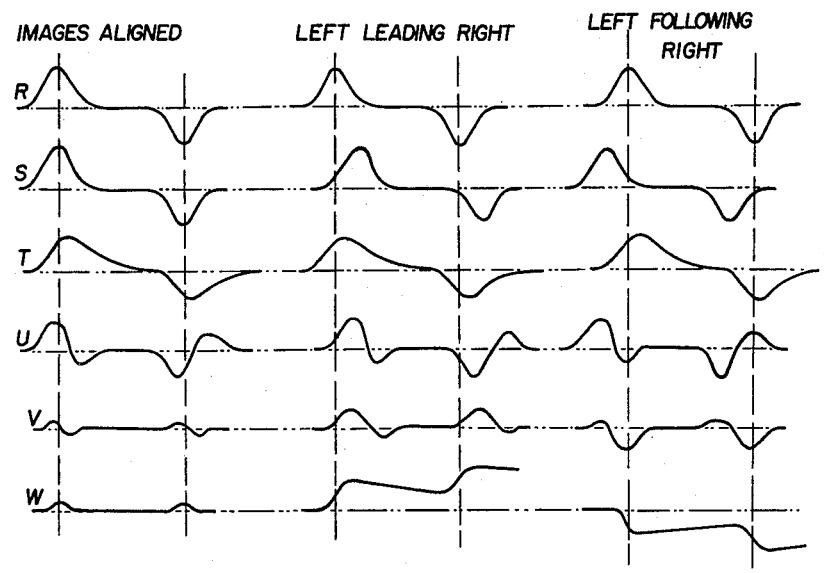
Figure 14:
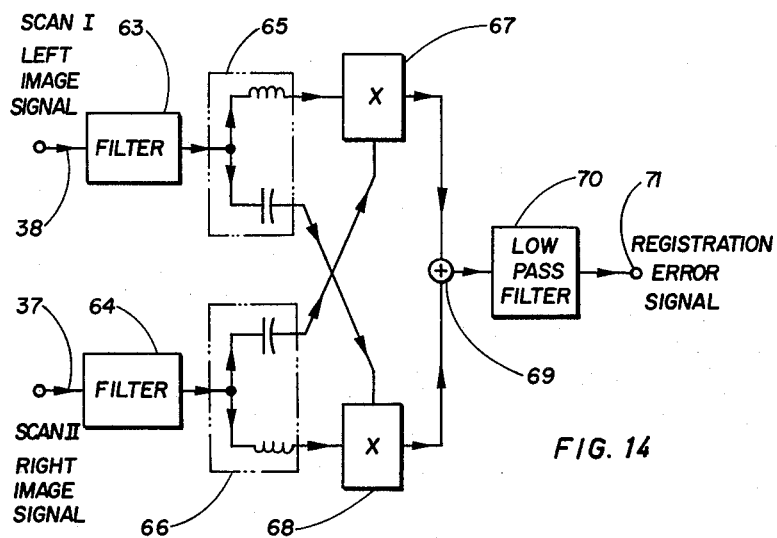
Figure 15:
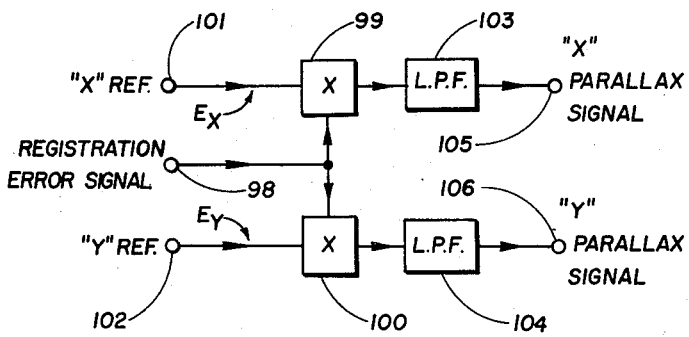
Figure 16:
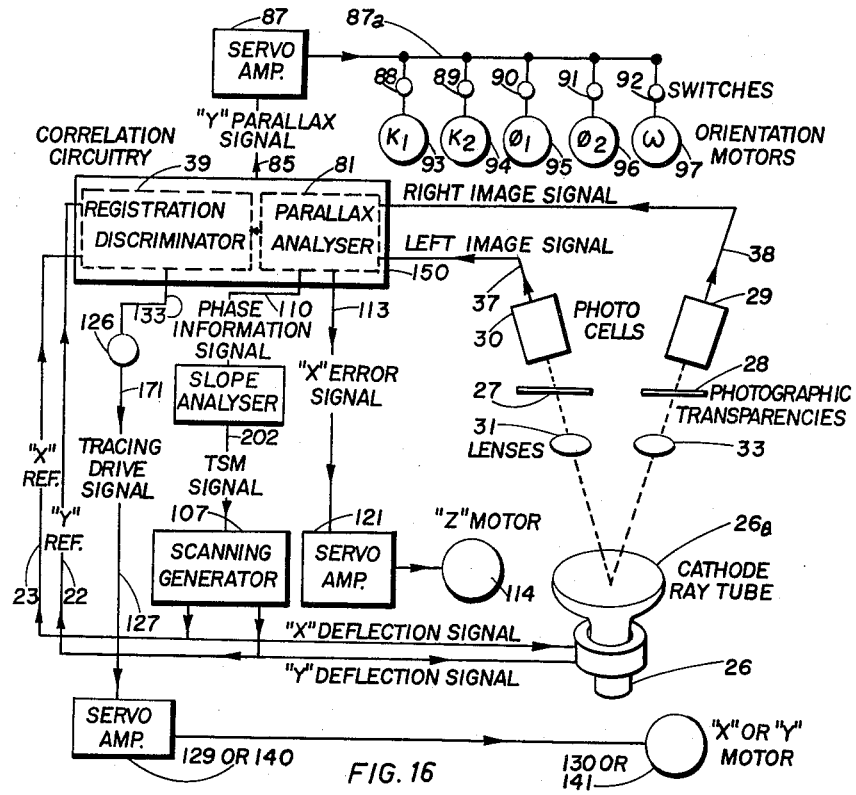
Figure 17:
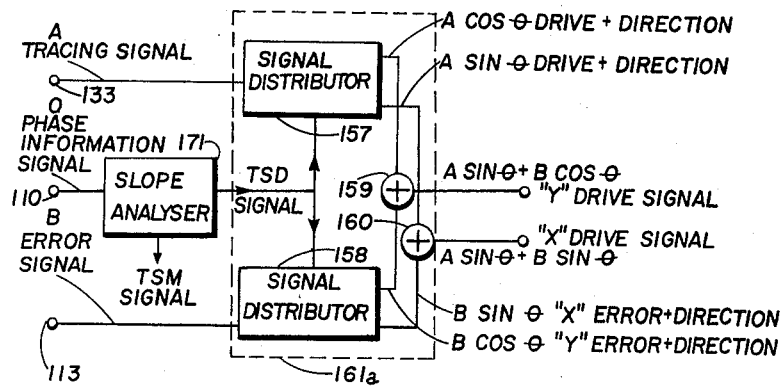
Figure 18:
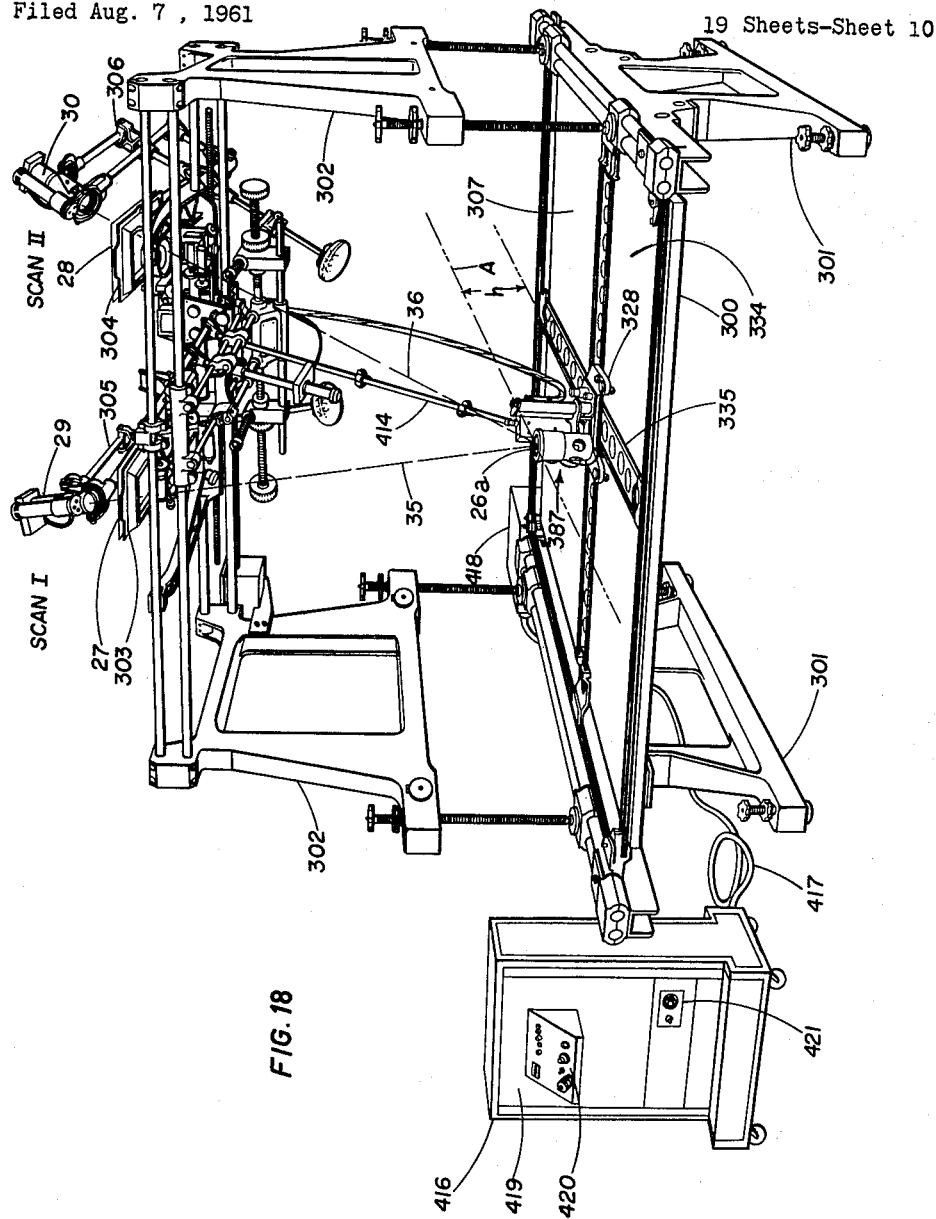
Figure 19:
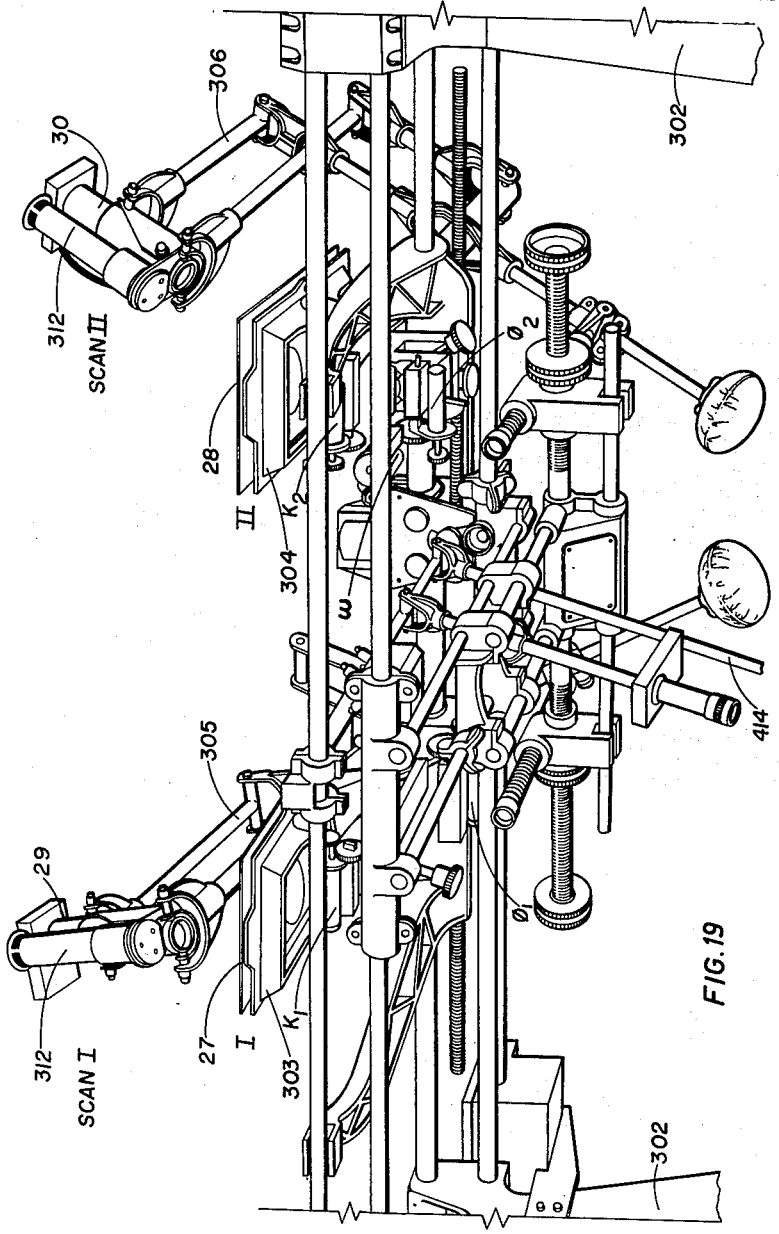
Figure 20:
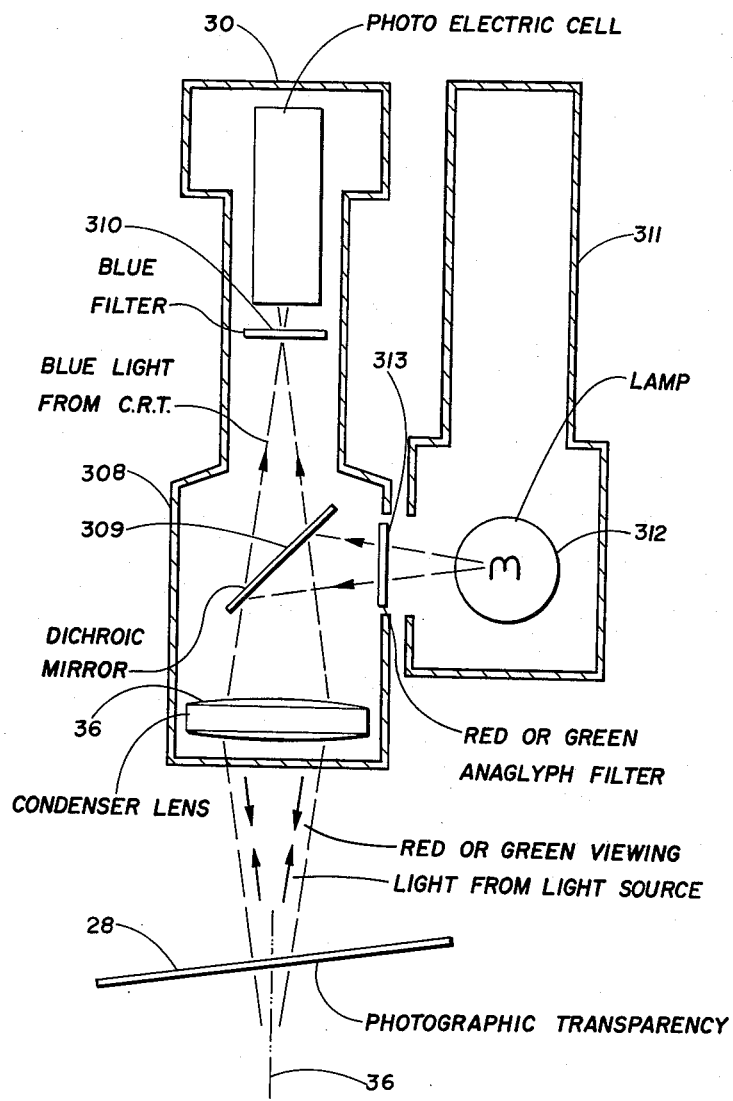
Figure 23:
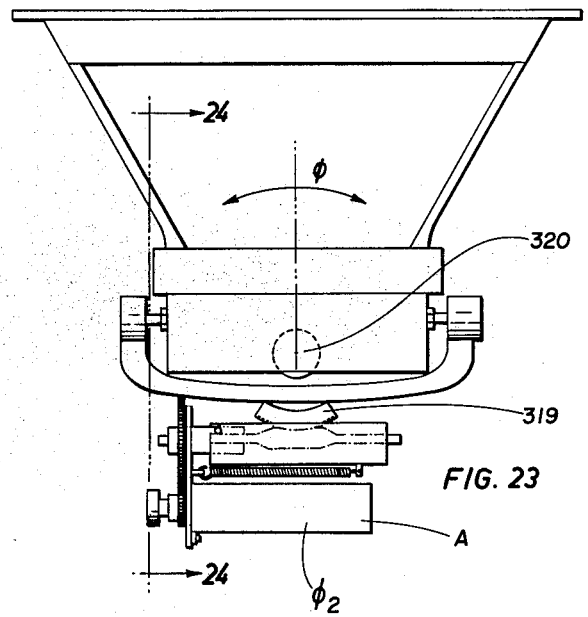
Figure 24:
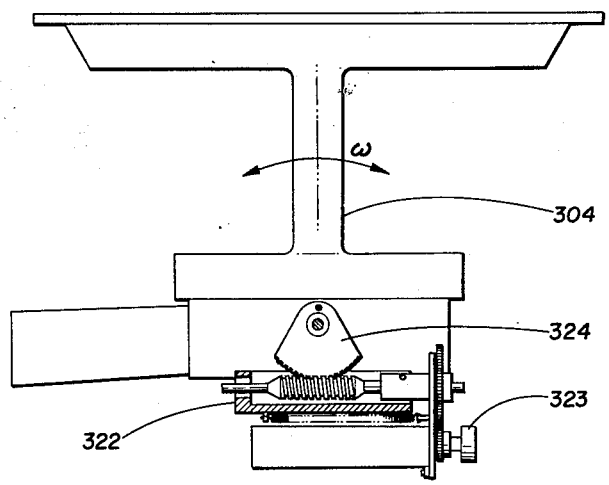
Figure 27:
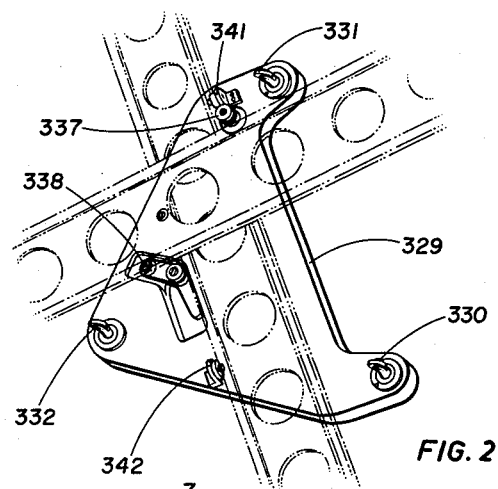
Figure 25:
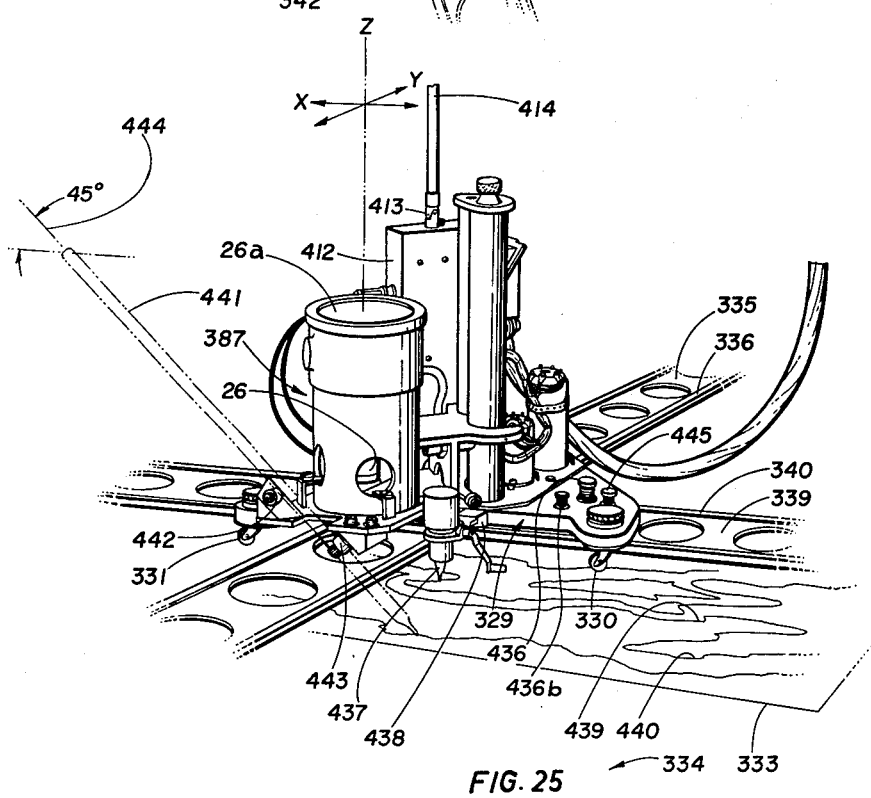
Figure 26:
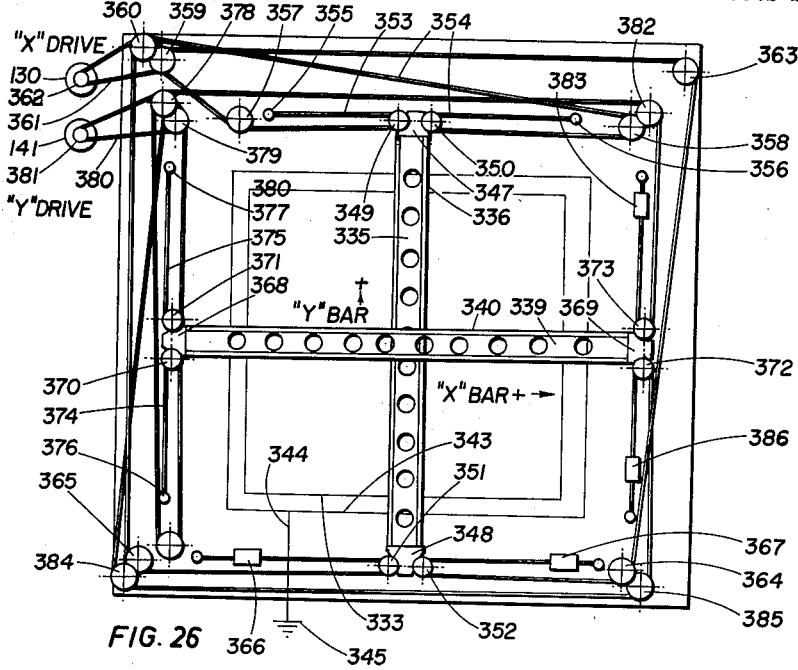
Figure 30:
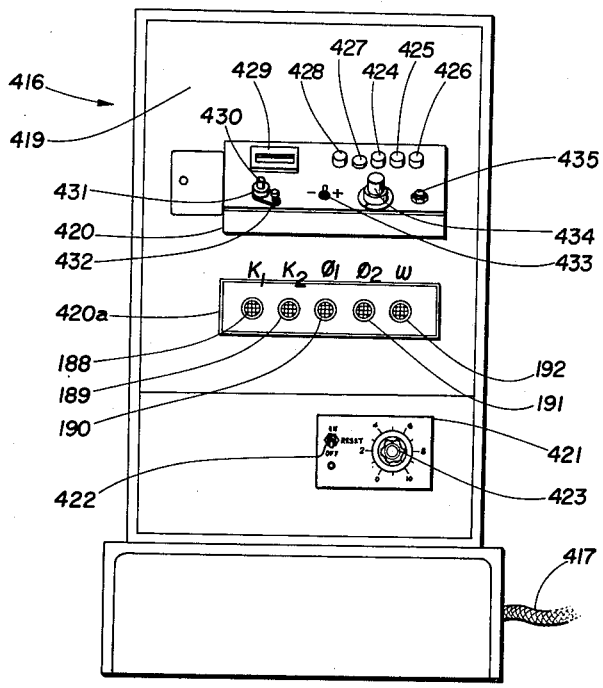
Figure 28:
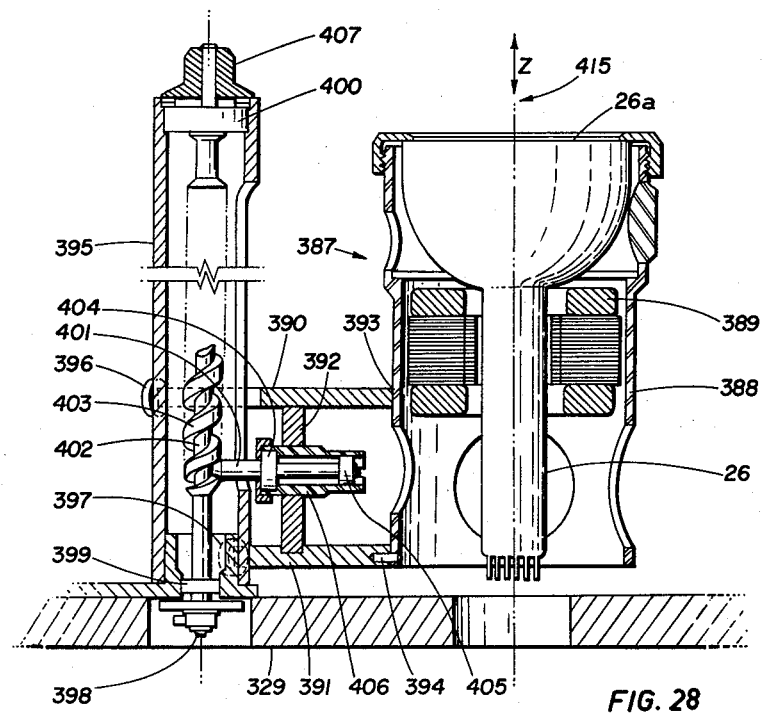
Figure 29:
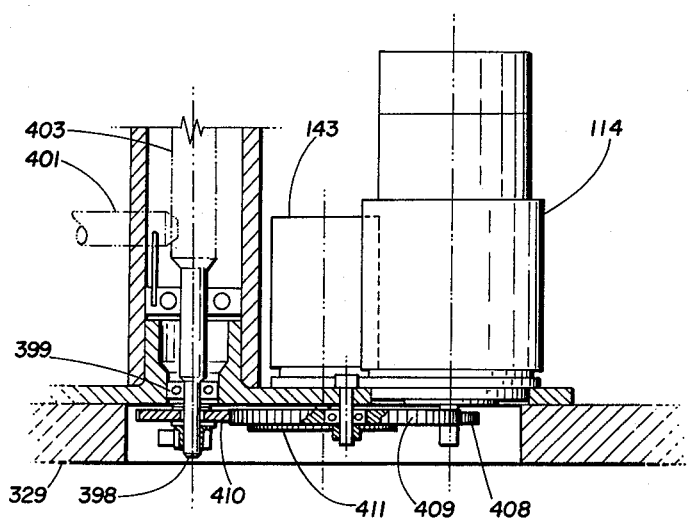
Figure 31:
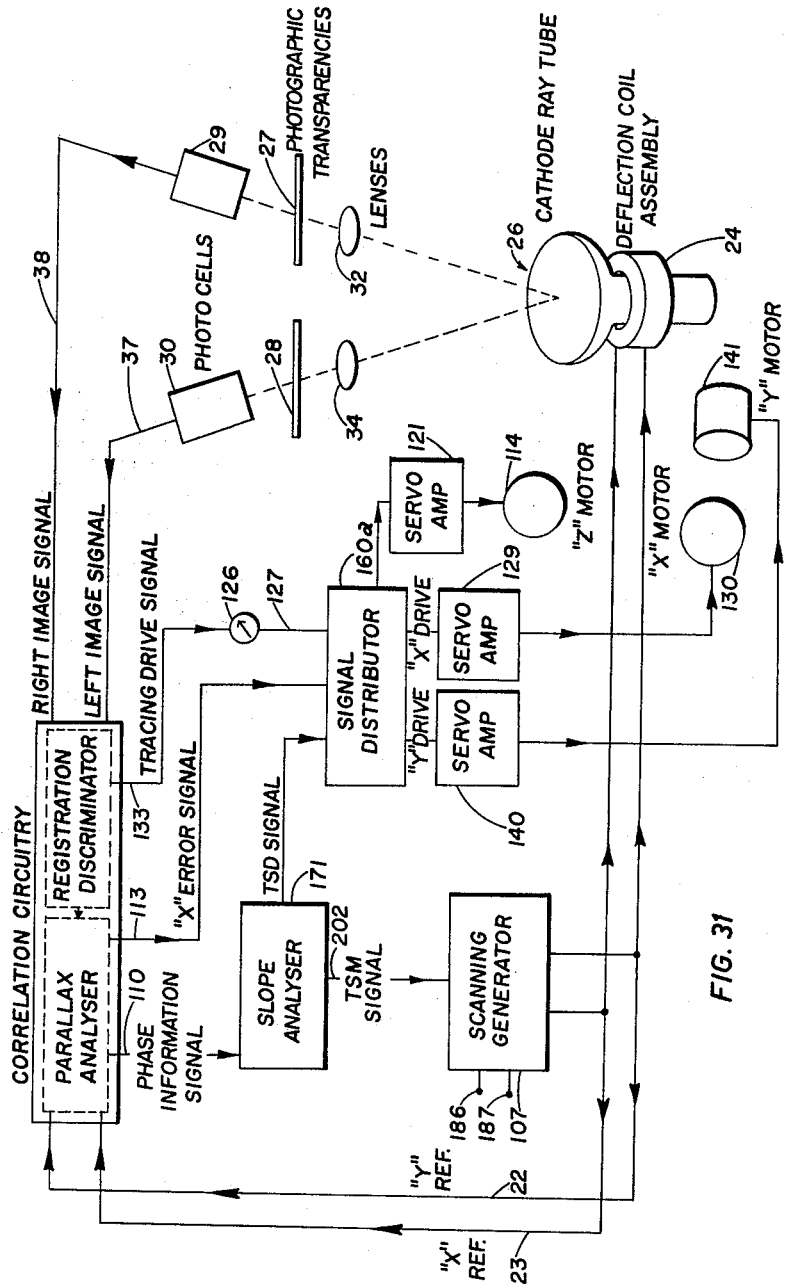
Figure 32:
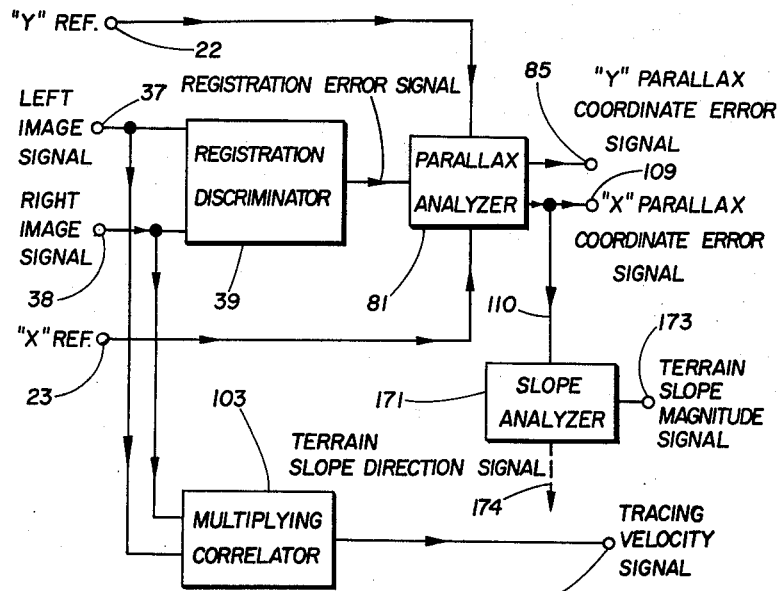
Figure 33:
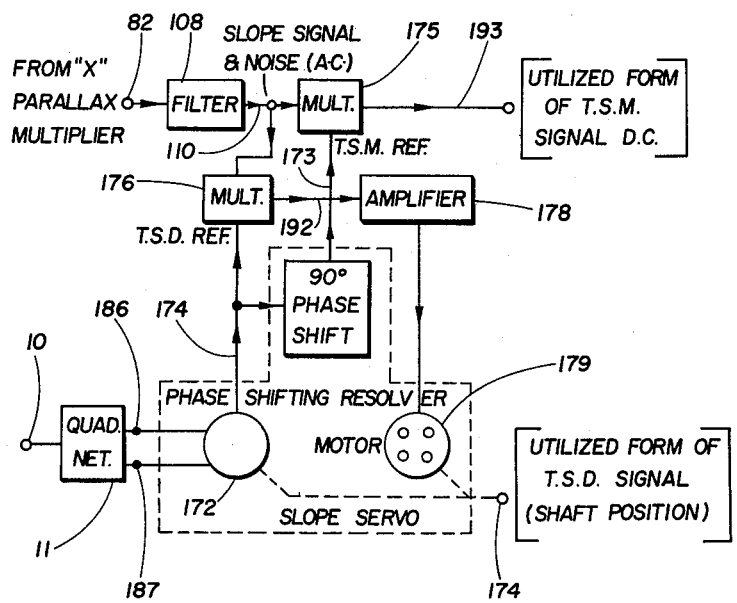

FIGURE 6 reveals typical wave forms at D and E of FIGURE 1;

FIGURE 7 reveals typical wave forms at F and G of FIGURE 1;

FIGURE 8 reveals the nature of the preferred form of scanning pattern;

FIGURE 9 is a simple circuit diagram illustrating the multiplication of two signals according to the invention in order to measure parallax or misalignment;

FIGURE 10 illustrates effect of the scan signals of FIGURE 9 of the circuit components at selected points for the continuation of aligned images in one column and misaligned images in another column;

FIGURE 11 discloses the effect of finite spot size, of high and low pass filters on an ideal boundary wave form;

In FIGURE 12 a more comprehensive signal processing system according to FIGURE 9 is revealed whereby a registration error signal responsive to both sense and magnitude is obtained from left and right image scan signals;

FIGURE 13 reveals the wave forms of an ideal boundary wave signal at various points in the circuitry of FIGURE 12 for both aligned and left and right misaligned signals;

FIGURE 14 illustrates a manner of cross-correlating the image information signals according to the invention whereby the effects of noise are substantially eliminated by the discriminator shown and hereinafter referred to as a registration discriminator;

FIGURE 15 discloses a simple form of parallax analyzer associated with which Tables I and II as set forth in this specification reveal the operative functions thereof as disclosed hereinafter;

FIGURE 16 is a simplified electronic schematic of that portion of the circuitry employed in profiling operations alone and which reveals image orientation responsive to Y parallax;

FIGURE 17 is a simplified electronic schematic of a signal divider of FIGURE 1 illustrating its manner of operation;

FIGURE 18 is an overall perspective of one form of the invention as applied to a conventional stereoplotting manually operated mechanism and rendering the same substantially automatic and independent of ocular examination of the image;

FIGURE 19 is an enlarged perspective of a portion of FIGURE 18 and revealing the location and manner of support of the stereo images in association with the scanning axes and photo-electric cells;

FIGURE 20 is a diagrammatic illustration of the optical illumination and photo-electric cells of the invention;

FIGURE 21 is an underside perspective view of a stereo image support of FIGURES 18 and 19 and revealing the location of the K, phi and omega motors thereon;

FIGURE 22 is a sectional view of a portion of the apparatus of FIGURE 21 revealing the K drive motor mechanism;

FIGURE 23 is a view of the apparatus of FIGURE 21 revealing the phi drive motor mechanism;

FIGURE 24 is a view of the apparatus of FIGURE 21 revealing the omega drive mechanism;

FIGURE 25 is an enlarged perspective of a portion of FIGURE 18 revealing the viewing platen means carriage and X and Y bar mechanism associated therewith;

FIGURE 26 is a plan diagrammatic illustration of the X and Y bar mechanism and coordinate drive motors therefor as applied to the plotting table of the apparatus of FIGURE 18;

FIGURE 27 is an underside perspective view of the carriage of FIGURE 25;

FIGURE 28 is a section on the line 28—28 of FIGURE 25 and revealing the Z coordinate adjustment of the viewing platen means;

FIGURE 29 is a section on the line 29—29 of FIGURE 25 and reveals the Z coordinate drive mechanism for the viewing platen means of FIGURE 28;

FIGURE 30 is a front elevation of electronic control console associated with the plotting apparatus revealed in FIGURE 18 and indicating the control buttons available to an operator for automatic control of plotting operations;

FIGURE 31 is a simplified electronic function schematic of those components of the system utilized in contouring operations;

FIGURE 32 is a simplified electronic schematic of those portions of the circuitry which may be regarded as a correlation unit and which translates the two image information signals into five separate data signals; and, FIGURE 33 is a simplified electronic schematic of those portions of the circuitry of FIGURES 1 and 2 which combine to provide a slope analyser function and constitute the slope analyzer of FIGURE 32.

In describing one suitable form of the system and method of the invention in detail in order to enable appreciation of the various aspects of the invention, it will be understood that the specific details discussed may be modified substantially as to the specific form of the mechanical apparatus and of the electronic apparatus having regard to the functions to be accomplished. The disclosure hereinafter set forth will deal first with the entire electrical schematic of the system, following which a discussion of a specific mechanical form will enable an appreciation of one satisfactory mechanical concept with which the particular form of electronic mechanism set forth herein may be utilized to achieve the objects of the invention. The operation of the mechanical-electronic system will then be reviewed in conjunction with the disclosure in a manner in which the teachings set forth herein may be applied in a variety of techniques.

ELECTRICAL SYSTEM

(i) Scanning Generator

Figure 3:
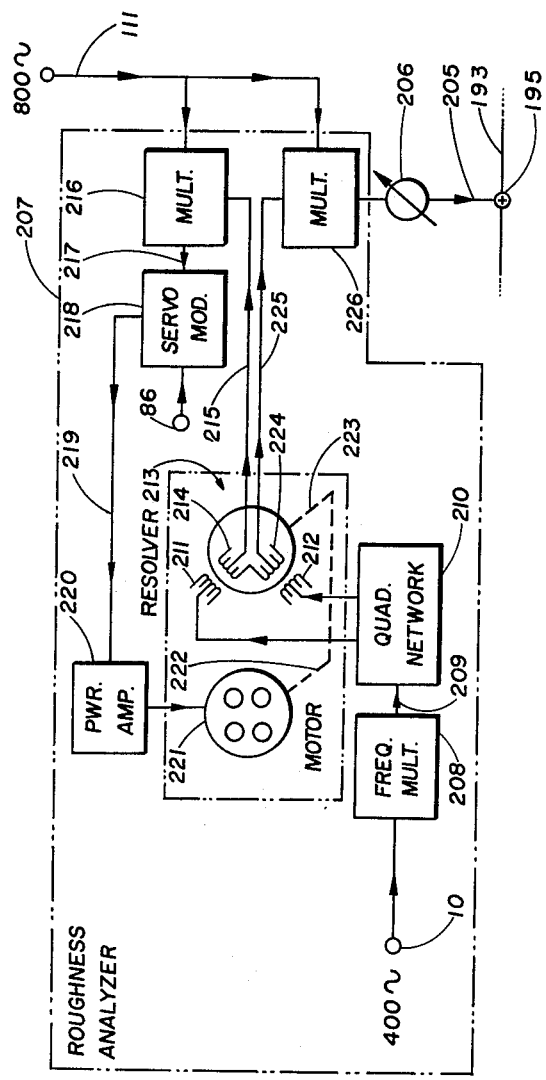
FIGURE 3 is a further continuation of FIGURE 1 and especially showing means for controlling the scanning pattern size according to roughness of the terrain.

In FIGURES 1 to 3 a 400 cycle sine wave signal from generator 10, which latter preferably may be a source from a suitable power supply for driving the system and motors associated therewith, is fed to a quadrature network 11 of conventional form to accomplish two outputs by lines 12 and 13 having a 90° phase relationship. By this 90° phase difference is accomplished in due course a circular processing of a cathode ray tube scanning pattern yet to be described and utilized in analysis of image information in the system of the invention.

Two independent coordinate signal generators of random-like form signal such as a "Y" coordinate noise generator 14 of about 1.6 kilocycles and an "X" coordinate noise generator 15 of say about 3.2 kilocycles have their signals added as at junctions 16 and 17 respectively to the signals from lines 12 and 13 to be passed through variable gain amplifiers 18 and 19 and conventional power amplifiers 20 and 21 by way of lines 22 and 23 for the Y and X coordinate scanning functions respectively by the deflection coils 24 and 25 of a suitable cathode ray tube device 26 to effect coordinate directional control of the scanning spot.

Figure 4:
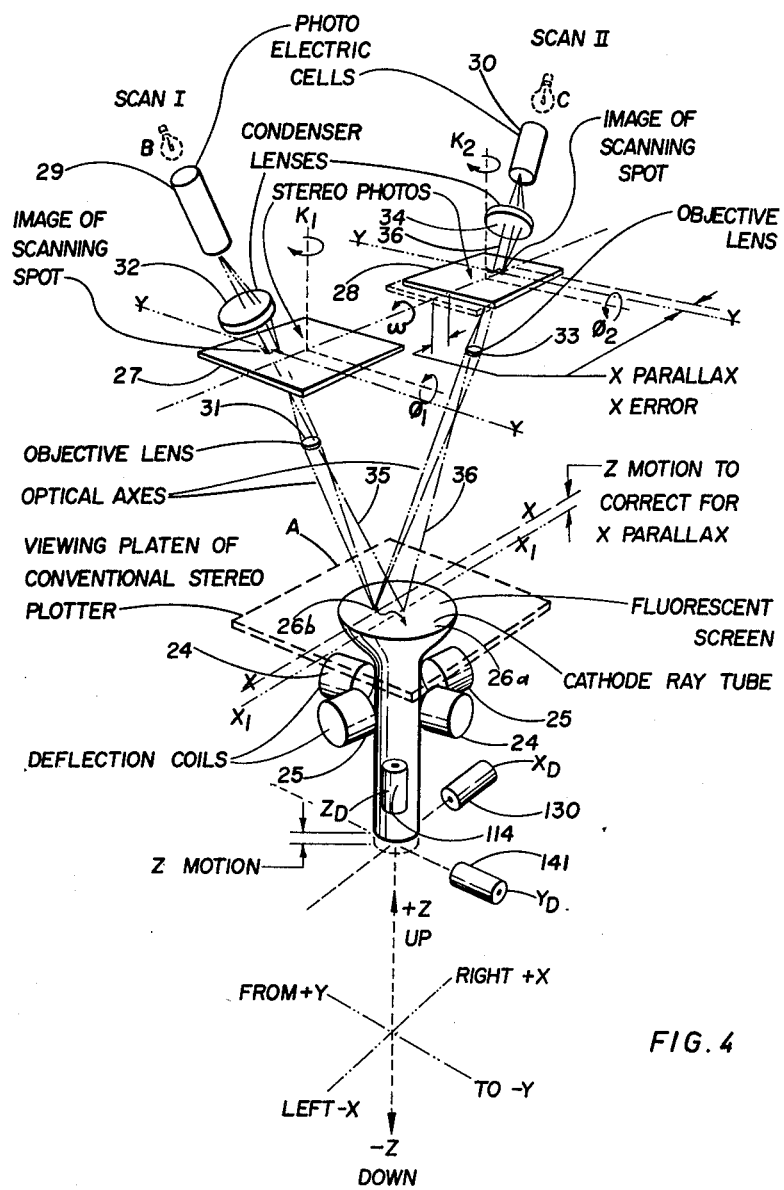
FIGURE 4 is a diagrammatic outline of the mechanics of the invention associated with the electrical drive therefor and relating the same to existing stereoplotting devices.

The cathode ray tube 26 is physically arranged in the manner schematically illustrated in FIGURE 4. A stereo photograph image pair comprising images 27 and 28 preferably in the form of glass plates are suitably supported after effecting relative orientation thereof in the manner described hereinafter whereby photoelectric cells 29 and 30 exposed through the objective and condenser lenses 31, 32, 33 and 34 are positioned to define corresponding scanning axes 35 and 36.

In FIGURE 4 the images 27, 28 and lens system 31 to 34 and associated mechanics as hereinafter described, may form part of a conventional projection-type stereoplotter but in which the viewing platen indicated in chain lines at A is replaced by the screen surface or scanning head 26a of cathode ray tube 26 and the light sources indicated in chain lines at B and C are replaced by the photo-electric cells 29 and 30. Accordingly any parallax in the X direction expressed as X error will be represented by a height difference or motion in the Z direction to correct for parallax accomplished by moving the viewing platen A or in the instance of the present invention by moving the cathode ray tube screen 26a in the Z direction. In order to effect three coordinate directions of automatic motion of the cathode ray tube according to the method and system of the invention, suitable coordinate drive motors $X_D$, $Y_D$, and $Z_D$ are employed for effecting required cathode ray tube motion corresponding to the manual directions of motion which an operator would otherwise impart to a viewing platen A.

It will be evident that a change in position of the cathode ray tube in the X or Y directions will effect the examination of a new coordinate position on the stereo images. In the event the scanning axes 35 and 36 do not precisely intersect corresponding points on the two stereo images, the error may be corrected by moving the cathode ray tube in the vertical direction to bring the axes to coincidence. It is of interest to note that assuming that there may be no error in the Y coordinate direction which will usually be the case with the conventional form of air photographic stereoplotting and upon orientation of the images prior to operation of the present system, then the sole measure of parallax will be error in the X direction owing to error in the Z direction as shown in FIGURE 4. As a result according to the system and method of the invention, coordinate errors of the axes with respect to corresponding image points or X parallax may be utilized to automatically move the cathode ray tube in the Z coordinate direction to compensate for the error in such manner that the position of the cathode ray tube screen 26a will be a measurement of the elevation of the point being examined. Additionally, however, assuming that the cathode ray tube is locked at a particular elevation, then the X coordinate error or parallax may be utilized to cause the scanning system to traverse the image in such manner as to seek minimum or zero parallax at the selected elevation whereby to effect contouring operations.

Figure 5:
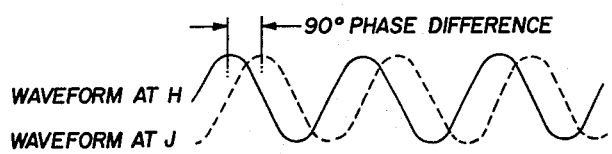
FIGURE 5 illustrates the wave forms at H and J of FIGURE 1.

The separate X and Y noise generators give independent motions in the X and Y directions to the scanning spot 26b on screen 26a of cathode ray tube 26 (FIGURE 4). The quadrature network 11 provides two periodic signals at H and J (see FIGURE 5) having a phase difference of 90°. These signals are added to the random noise signals from the band pass networks 14a and 15a to give a low velocity circular motion to the scanning spot. As will be evident from FIGURE 6 a typical noise signal at D or E is of random nature in amplitude. The wave form at F and G is of the processed form shown in FIGURE 7. The circular motion of the scanning spot is small relative to the random motion and does not change the character of the pattern appreciably. Thus in FIGURE 8 is shown a greatly enlarged scanning pattern having a circular scanning motion in the direction of the arrow K on an effective radius L, the width M of the annular path of the scanning pattern M' so generated being at any instant a function of the instaneous amplitude of the noise signals. The gain control units 18 and 19 vary the size of the scanning pattern, that is to say, the radius L as well as the width M of the path in response to the signal from the roughness and slope analyzers (to be described) connected to terminal 19a.

(ii) *Registration Discriminator*

Referring again to FIGURES 1 to 3, the photo-electric cells 29 and 30 develop output signals in lines 37 and 38 and are discriminated as to time by the registration discriminator device enclosed by chain lines 39.

In the discriminator 39, image signals from lines 37 and 38 are communicated to band pass networks 40 and 41 which accommodate the information spectrum of interest and pass thence to two quadrature networks 42, 43 coupled with the voltage wave form multipliers 44 and 45 in lattice connection 46. The multipliers 44 and 45 deliver their output signals by way of lines 47 and 48 to junction 49 from which a registration error signal is obtainable by way of line 50.

An understanding of the registration discriminator 39 will be obtained by a consideration of some of the elementary aspects of signal processing.

Referring to FIGURE 4 and identifying the scanning of images 27 and 28 as Scan I and Scan II, the photo-electric cells 29 and 30 will generate signals in lines 38 and 37 responsive to the image information scanned by the scanning pattern of the nature described with reference to FIGURE 8.

In simple concept, therefore, referring to the processing schematic of FIGURE 9, the filters 51 and 52 of the band pass type may process the ideal boundary wave forms 53 and 54 to provide wave forms at N and O of the forms shown in FIGURE 10. These signals when multiplied by a voltage multiplier 55 provide a wave form at P of the forms shown in FIGURE 10 which may further be processed by low pass filter 56 to provide the wave forms at Q (shown in FIGURE 10).

The voltage wave form multiplier may be of any suitable known form, as for example, of the type in U.S. application, Serial No. 798,494, now Patent No. 2,967,954, relating to Diode Lattice Multiplier With Inherent Limiting and assigned to the same assignee as this application.

The multiplier 55 should provide an output signal approximately proportional to the product of the two input signals at any instant when the left and right optical axes 35 and 36 of Scan I and Scan II are aligned to corresponding points in the images 27 and 28. The scanning spots cross corresponding image boundaries simultaneously to give the wave forms shown under the heading "Images Aligned" in FIGURE 10. Since the boundary signals in both channels have the same polarity, the multiplier output is always positive.

Any image is made up of areas differing in density and separated by boundaries. It is the boundaries that produce signals useful for aligning purposes. In FIGURE 11 an ideal boundary wave form is shown and which is adapted to be produced by an infinitely small scanning spot crossing perfectly shaped scanning boundaries. The scanning spot in FIGURE 11 is assumed to be moving across a light band on a dark background giving first a positive and then a negative boundary signal. A signal representing an ideal boundary wave form will never actually by achieved due to the effect of finite scanning spot size also illustrated in this figure. The spot size, therefore, has a smoothing effect on image sharpness. The signals from the photo-electric cells 29 and 30 are filtered by the filters 51 and 52 (FIGURE 9) to reduce both the high frequency quantum noise and low frequency signals from large image details. The effect of the low pass filter on a boundary wave form and of the high and low pass filters is also shown in FIGURE 11.

When parallax is present the scanning pattern will be displaced on one of the images 27 and 28 relative to the other. The scanning spot will therefore cross corresponding image boundaries at different times. The resulting boundary signals reach their maximum values at different times as is shown in the second set of wave forms of FIGURE 10 under the heading "Images Misaligned" whereby the simple discriminator of FIGURE 9 will give a smaller product or output signal at Q. The output of a multiplier is zero if either input signal is zero and therefore a small as well as a relatively large value of parallax may be represented by a zero output.

If according to this invention a quadrature network is combined with a multiplier, the polarity of the output will reveal which image signal is leading in time. Thus, in FIGURE 12 signals in lines 37 and 38 may be filtered as before and pass through a quadrature network 57 comprising an inductance 58 in one channel and a condenser 59 in the other and then multiplied by a multiplier 60 as before, the output of which is filtered by low pass filter 61 to develop a registration error signal at 62. The wave forms change through the circuit of FIGURE 12 for an ideal boundary wave form as illustrated at points R to W in FIGURE 13 under the group headings, "Images Aligned," "Left Leading Right," and "Left Following Right."

In reference to FIGURE 13 it will be evident that the action of the registration discriminator is as follows:

(1) Under conditions of perfect registration of the images with the optical axes, the output is zero.

(2) With moderate misalignment, the output will be positive or negative depending upon which image signal is leading in time.

(3) Reversal of the scanning direction will reverse the sign of the output since the leading signal becomes the lagging one and vice versa.

(4) Misalignment in a direction at right angles to the direction of scan does not produce timing differences and will therefore give zero output.

(5) Under conditions of severe image misalignment, the image signals may be dissimilar to the extent of no correlation and no useful output.

According to a preferred system of the invention, a double quadrature network and multiplier arrangement is employed in order more efficiently to separate alignment signals from the effects of noise. In simple schematic form the duplex multiplier quadrature registration discriminator preferred is illustrated in FIGURE 14 in which signals from lines 37 and 38 are filtered by filters 63 and 64 and duplexed through two quadrature networks 65 and 66 to the two multipliers 67 and 68, the outputs of which are added as at junction 69 and processed by low pass filter 70 to provide a registration error signal at terminal 71 having the characteristics described. The discriminator of FIGURE 14 may be regarded as a balanced registration discrimination having regard to the balancing duplexing circuitry involved and also corresponds to the registration discriminator form designated by numeral 39 in FIGURE 1.

PARALLAX ANALYZER

The registration error signal is communicated to the dual band pass filter 72 (FIGURE 1) which is in the nature of a cross-over network frequency divider, effecting division of the image intelligence signal again into separate X and Y image intelligence signal functions communicated by lines 73 and 74 respectively to multipliers 75 and 76 in which they are multiplied against the corresponding reference deflection signals from lines 22 and 23, the latter being of inherent first order differentiated character as indicated at 77 and 78 and which are suitably delayed by delay devices 79 and 80 to compensate for signal delays in circuit processing of the image intelligence signals. The dual band pass filter 72, associated delay device and multiplier device described may be regarded as a parallax analyzer unit within the chain line surround 81 and delivering output signals from lines 82 and 83 representing Y and X coordinate error components which may be regarded as representing Y and X parallax.

The Y parallax signal, i.e., the error or parallax signal in the Y coordinate direction is processed by the servo modulator 84. Signal from line 83 modulates a 400 cycle square wave signal from source 86 communicating by line 86a to modulator 84. The 400 cycle square wave signal modulated by direct current components of the Y error signal communicates by line 85 servo amplifier 87 and line 87a to a series of manual switches 88 to 92 inclusive serving the orientation servo motors 93 to 97 inclusive for effecting relative alignment of images 27 and 28 in directions and on axes $K_1 K_2 \phi_1 \phi_2 \omega$ shown in FIGURE 4 and described hereinafter.

In concept the parallax analyzer 81 may be appreciated in its more fundamental aspects by a review of FIGURE 15 and Tables I and II.

TABLE I.—ASSUME MISALIGNMENT IN "X" DIRECTION SUCH THAT REGISTRATION ERROR SIGNAL IS POSITIVE WHEN SCANNING IN "X" DIRECTION

| Direction of scan | Reg/disc output | $E_x$ | $E_y$ | "X" parallax signal | "Y" parallax signal |
|---|---|---|---|---|---|
| +"X" (left to right) | + | + | 0 | + | 0 |
| −"X" (right to left) | − | − | 0 | + | 0 |
| +"Y" (from) | 0 | 0 | + | 0 | 0 |
| −"Y" (to) | 0 | 0 | − | 0 | 0 |

TABLE II.—ASSUME MISALIGNMENT IN "Y" DIRECTION SUCH THAT REGISTRATION DISCRIMINATOR OUTPUT IS POSITIVE WHEN SCANNING IN "Y" DIRECTION

| Direction of scan | Reg/disc output | $E_x$ | $E_y$ | "X" parallax signal | "Y" parallax signal |
|---|---|---|---|---|---|
| +"X" (left to right) | 0 | + | 0 | 0 | 0 |
| −"X" (right to left) | 0 | − | 0 | 0 | 0 |
| +"Y" (from) | + | 0 | + | 0 | + |
| −"Y" (to) | − | 0 | − | 0 | + |

In FIGURE 15 is disclosed a simplified form of parallax analyzer having a registration error signal available at terminal 98 and which may be of the form available from line 50 of FIGURE 1. The registration error signal at 98 is communicated to the multipliers 99 and 100 for multiplication against respective X and Y reference signals available from terminals 101 and 102 being the cathode ray tube deflection signals as before described. The outputs from multipliers 99 and 100 are processed by low pass filters 103 and 104 to provide at terminals 105 and 106 respectively an X parallax signal and a Y parallax signal. It will be appreciated that the direction of scanning at any moment when using a random scanning pattern is constantly changing. Therefore the output of the registration discriminator available from line 50 (FIGURE 1) will change even under circumstances of constant alignment error. The purpose of the parallax analyzer is to sort out of the fluctuating signal from the registration discriminator into steady X and Y parallax signals. The output from the registration discriminator, i.e., the registration error signal, is separately multiplied with the X and Y reference signals which in turn are derived from the scanning generator 107 (FIGURE 1) and indicate the scanning direction at any instant. The low pass filters 103 and 104 smooth the output signals available at 105 and 106. The Tables I and II summarize the action of the parallax analyzer with various combinations of scan and misalignment directions. The X and Y parallax signals are seen to be unambiguous and independent each of the other or discrete.

The X parallax signal obtained from line 83 may embody simple multiple frequency components due to the nature of the terrain being examined.

It should be appreciated at this point, however, that the X coordinate intelligence signal is responsive to various ground conditions and error due to parallax and may be zero, or may embody 400 cycle components, 800 cycle components and in addition direct current components together therewith or alone. The frequency components responsive to terrain character will be simple multiples of 400 cycles. Ordinarily it will be found necessary only to accommodate an additional first multiple for reasons hereinafter set forth. Accordingly, the signal from line 83 is processed by the filter network 108 to provide a direct current signal output line 109, a 400 cycle signal output line 110, and a 800 cycle output line 111, all of the said signals being rendered substantially devoid of all non-periodic signal fluctuations and noise by filter network 108.

The direct current X parallax coordinate error signal obtainable from line 109 is similar in character to the Y parallax signal obtainable from line 82 in that it contains magnitude and directional information as a function of the parallax error sensed. The 400 cycle slope direction signal from line 110 is responsive in amplitude and phase to the inclination of the slope of the terrain and the azimuth or direction of the inclination or slope. The 800 cycle roughness signal from line 111 is similarly responsive in amplitude and phase to the extent and orientation of multiple high and low points of the terrain within the scanning pattern. Some skilled persons might wish to assume that the amplitude of this signal, as a measure of terrain roughness, is in fact responsive to the average inclination of the slopes within the scanning path. It is not thought desirable to enquire into the academic theoretrical aspects of these signal characteristics in this specification for the reason that the signals as processed according to the disclosure herein do realize the objects and utilities of the invention in the manner set forth.

The X and Y signals obtainable from lines 109 and 82 contain respective parallax information, it being understood that after initial alignment the Y parallax will be zero. While profiling operations requiring only X parallax information may be processed in relatively simple fashion by direct circuitry, contouring operations as hereinafter discussed require the utilization of phase information from signals in line 110 with an additional compensation for terrain roughness which will be supplied by the signal from line 111. Selection may be provided for profiling in either the X coordinate direction or the Y coordinate direction.

"X" COORDINATE PROFILING CIRCUITRY
XZ PLANE

The X coordinate error signal from line 109 is utilized to modulate the 400 cycle square wave signal in servo modulator 112 to provide an X coordinate parallax signal in line 113 which is communicated to the Z drive motor 114 (FIGURE 2) through terminal 115 and switch arm 116 of the gang selection switches 117 to 120 by way of servo amplifier 121.

Referring to FIGURE 4, it will be apparent that the scanning head 26a may be moved manually in either an X or Y coordinate horizontal direction to effect a simultaneous examination of images 27 and 28 along a selected coordinate line. In order to maintain correlation or achieve zero parallax as the cathode ray tube is moved along a selected coordinate path, the Z drive motor 114 will accomplish a vertical or Z direction adjustment of the position of the cathode ray tube responsive to the Z coordinate error signal. In result the vertical motion of the cathode ray tube in conjunction with its progress along the horizontal path of selected coordinate direction effectively describes a model profile, which may be interpreted directly in line or solid model form expressed through suitable mechanisms responsive to horizontal and vertical motion of the cathode ray tube, the latter motion being a function of the Z motor driving effect usually to be derived from X parallax.

The stereo images may be inspected in a variety of programmed methods. Preferably, however, one may examine in the Y coordinate direction in steps on uniformly spaced X coordinate lines to develop a plurality of profiles. Accordingly, the system of the invention contemplates the provision of an automatic drive for effecting selected coordinate motion of the cathode ray tube in either the X or Y direction to examine the stereo images between minimum and maximum limits thereon on spaced stepped apart ordinates. The cathode ray tube motion therethrough will begin at a minimum ordinate value and proceed at predetermined velocity to a maximum ordinate value from which it is stepped to the next ordinate and returned to a minimum coordinate value at predetermined velocity preferably in interlaced manner.

In FIGURE 2 a profiling drive source for constant velocity profiling motion may be provided by source 10 through selection switch 122 and line 123 to the electronic reversing switch device 124 responsive in its actuation to the boundary limit switch 125. Switch 125 is actuated at the end limits of travel of the cathode ray tube 26 and carriage assembly associated therewith (described hereinafter) at the ends of X and Y coordinate travel thereby to effect return of the carriage and cathode ray tube. The signal from device 124 proceeds through attenuating potentiometer 126 to effect a further manual control on velocity and thence by tracing drive signal line 127 to terminal 128 of the X coordinate gang switch 118 thus to servo amplifier 129 and X drive motor 130.

Preferably the system of the invention provides for drive in a coordinate direction for profiling purposes by a predetermined but nevertheless controllably variable velocity over difficult terrain. Accordingly switch 131 may connect through terminal 132 by a manual selection to obtain a drive signal from line 133 and multiplier 134 responsive to the degree of correlation between the two image signals derived from lines 37 and 38 (FIGURE 1). For operational purposes, the signal from line 133 is processed through servo modulator 134a to modulate a 400 cycle square wave from source 86 to render the same compatible with the motor drive system.

The cathode ray tube and its associated carriage must be shifted to the next Y coordinate line at the end of each trace preferably in equal steps. For this purpose the signal from boundary limit switch 125 proceeds additionally by line 135 through pulse amplifier 136 to the servo positioning device 137 delivering a position error signal by line 138 to terminal 139 of the Y drive gang switch 119 thence through servo amplifier 140 to Y drive motor 141 which latter drives the cathode ray tube horizontally in the Y direction until the drive signal is reduced to zero. Accordingly, the automatic profiling drive proceeds at either a uniform selected velocity or variable velocity accordingly to manual selection of switch 131 to effect automatic profiling. The variable Z position of the cathode ray tube is read out from the output signal from line 142 from the synchro transmitter 143 operatively related by mechanical connection 144 to motor 114 and therefore responsive to Z coordinate position of the cathode ray tube. Thus a profiling signal output may be obtained from terminal 145. The profile signal is synchronized with the drive of any conventional recording device by means of the X or Y synchronizing signals obtainable from terminals 146 and 147 in turn derived from the appropriate synchro transmitters 148 and 149 operable responsive to the position of the cathode ray tube 26 in the X or Y coordinate directions as effected by coordinate drive motors 130 and 141 (FIGURE 4).

"Y" COORDINATE PROFILING CIRCUITRY
YZ PLANE

All X and Z coordinate operations are effected responsive to X coordinate error signal (parallax), the images having been previously oriented to reduce the Y coordinate error signal (parallax) effectively to zero. It should be realized that X parallax is an expression of height or elevation in the Z coordinate direction. This information may be plotted in any horizontal direction in the theoretical sense to provide a profile in that direction. In the instant case, it is convenient to provide for profiling plots in either the X or Y coordinate direction. The direction of the plot therefore has no influence on the height information and the converse is also true. Accordingly, in order to plot a profile in the Y coordinate direction for convenience the same essential circuitry is involved, providing only for a different direction of traverse of the cathode ray tube.

In plotting profiles in the Y coordinate direction, the gang switches 117 to 120 cause the switch arms thereof to contact the YZ terminals 117b, 128a, 139a and 115a. The circuit components and function are similar to that described with reference to the X coordinate profiling. It is of interest to observe that in relation to the gang switches 117 to 120 the terminals XZ denote the plane of motion, i.e., the height information along an X coordinate line. The terminals YZ indicate the profiling of height information along the Y coordinate line. Finally, the terminals YZ denote an XY plane in which the elevation or Z coordinate is constant, that is to say, the XY position is significant for contouring operations in which the boundaries of a level plane of selected height may be defined and the contouring line of such plane traced.

Summarizing by way of referring to FIGURE 16 in which the circuitry is simplified in relation to the components utilized in profiling operations alone, it will be observed that to profile automatically in the X direction or in the Y direction a tracing drive signal is obtained from the correlation circuitry 150 embodying the discriminator and analyzer 39 and 81 respectively. This signal is applied through line 127 to the selected servo amplifier 129 or 141 to effect X or Y motor drive in the horizontal plane on the cathode ray tube. As the cathode ray tube moves horizontally the Z motor maintains the pattern centre in contact with the surface of the theoretical model of the terrain defined by two images 27 and 28 of FIGURE 4. The drive of the Z motor being in response to X parallax signals, the Y motor forms a part of a positioning servo which holds the cathode ray tube rigidly in the Y direction. The scanning pattern centre is thereby constrained to trace out a straight profile in the X direction or in the Y direction having regard to the positioning of the gang selection switches 118 to 120. When profiling in the Y direction the Y position is selected by an automatic stepping system as described. When the cathode ray tube reaches the end of the theoretical terrain model being profiled as defined by the images, a limit switch operates as described whereby the profiling operation is reversed and the stepping system or servo positioning device 137 is effected to shift the cathode ray tube to a new Y position for the next profile. A read-out is provided from terminals 145, 146 and 147 as for example in the manner shown in chain line communication to a profile recorder 151 having an X or Y selecting switch 152 and having a Z profile signal input signal 153 being adapted to provide a tape record 154 having the profile 155 described thereon by the pen 156.

CONTOURING CIRCUITRY XY PLANE

In addition to a drive and error signal, the contouring mode of operation requires directional information. If the cathode ray tube is located at a predetermined elevation and is moved manually to reduce the X coordinate error (parallax) signal to zero (FIGURE 1, line 82), one will arrive at a point on a theoretical contour line of corresponding elevation. If one moves the cathode ray tube in the horizontal plane, in a manner maintaining the X error of parallax signal at zero, then the motion given to the cathode ray tube will trace a contour line and the path of motion should close if the contour line on the terrain being examined closes in fact. The present invention contemplates automation of the contouring operation by eliminating the manual manipulation of the cathode ray tube viewing platen at a selected fixed height or elevation.

The motion of the cathode ray tube must be given direction. A motion drive velocity signal is available as before described from line 127. A coordinate drive signal is available as before described from line 113. According to this invention it has been determined that terrain slope is always at right angles to a contour line and accordingly motion at right angles to the direction of slope is the motion desired to be given to the cathode ray tube for contouring purposes. The measure of the slope under any particular scanning pattern is represented by phase information within the 400 cycle signal available from line 110 where the slope is of relatively simple uni-directional nature within the area covered by the scanning pattern. The signal available from line 110 may therefore be regarded as a useful direction control signal required.

FIGURE 17 is a simplified function diagram of signal distribution responsive to directional information of slope utilized to effect steering. It is intended that the actual steering be effected by energizing the X and Y coordinate motors 130 and 141 simultaneously but at different speeds, depending upon the nature of the directional information.

Thus in FIGURE 17 tracing signal A is combined with terrain slope direction control "TSD" signal $\theta$ in the signal distributor 157 and distributed in combined form to two outputs, the said outputs being $A \cos \theta$ and $A \sin \theta$ respectively. Thus the drive signal is processed in such manner that it contains directional information in two outputs at right angles. The X error signal B is likewise combined with the direction control TSD signal $\theta$ in the signal distributor 158, the combined signal being distributed to two outputs of 90 degrees phase difference as $B \cos \theta$ for the X coordinate. The respective cos and sin $\theta$ are added at the junctions 159 and 160 to provide a Y servo signal $A \sin \theta$ plus $B \cos \theta$ and an X servo signal $A \cos \theta$ plus $B \sin \theta$. These duplex signal combining and handling operations may be expressed by a variety of circuitry. A preferred circuit arrangement is illustrated in FIGURE 2 in which the duplex signal distributor 160a is in the form of a rotor positioned resolver 161, the latter being disclosed in British Patent No. 782,551, Italian Patent No. 562,456, Canadian Patent No. 563,283, German Patent No. 1,043,486 and U.S. Patent No. 2,810,086.

During contouring the cathode ray tube viewing platen means 26a is subjected to two independent motions in the XY plane as illustrated in FIGURE 4: a tracing motion, in a direction parallel to the required contour, hereinafter called the contour tracing motion, and responsive to the drive velocity signal; a corrective motion in a direction normal to and directed toward the required contour, hereinafter called the contour seeking motion, and responsive to the X parallax or height error signal.

It is clear that while the seeking and tracing motions are mutually perpendicular in the XY plane, the actual directions in this plane are determined by the terrain inclination at the point of examination such that the tracing motion is in the direction of zero slope and the seeking motion is in the direction of maximum slope. It is necessary therefore that the direction of application of the contour motions be controlled responsive to the azimuth of terrain slop as expressed by the phase information from line 110.

The direction of application of contour motion may be thus controlled by means of a resolver 161 of conventional design as disclosed in FIGURE 2 in which two perpendicular stator coils are magnetically coupled in a variable manner to two perpendicular rotor coils. The drive velocity signal is applied to stator winding 162 through line 163 from line 127. The coordinate drive or X parallax signal is applied to stator winding 164 from line 113. The rotor windings 165 and 166 communicate respectively to servo amplifiers 129 and 140 with the X and Y gang switches 118 and 119 in the XY contouring position at terminals 167 and 168.

The drive velocity signal from line 127 is distributed by the resolver to lines 169 and 170 in the ratio of sin $\theta$ and cos $\theta$ respectively to produce a resultant motion of the cathode ray tube assembly in the XY plane at an angle θ where θ is the angle of the resolver rotor. This motion is the required contour tracing motion, providing the angle θ of the resolver rotor corresponds to the terrain slope azimuth. The coordinate drive (parallax) signal is distributed by the resolver to lines 169 and 170 in the ratio of cos θ and sin θ respectively to produce a resultant motion of the cathode ray tube assembly in the XY plane at an angle of θ±90° which is the required contour seeking motion. The components within the chain lines 171 are collectively called a slope analyser, and serve continuously to adjust the angle θ of the steering resolver rotor to correspond to the azimuth of the terrain slope, and in response to the phase information of direction control signal from line 110.

The slope analyser 171 comprises a motor driven resolver 172 which produces a terrain slope magnitude (TSM) and a terrain slope direction (TSD) signal in lines 173 and 174 respectively communicating to multipliers 175 and 176 as reference inputs therefor to be multiplied against the phase information slope signal from line 110. The multiplied output from multiplier 176 is used to modulate a 400 cycle square wave drive signal 86 in modulator 177 which is amplified by amplifier 178 to excite the drive motor 179 thereby simultaneously to rotate the shafts 180, 181, 182 indicated in chain lines of the motor and resolvers operatively related through the mechanical connection line 183. Stator windings 184 and 185 of resolver 172 are excited by 400 cycle signals at quadrature from terminals 186 and 187 and communicate by way of lines 188 and 189 thereto. Because these signals are in 90° phase relationship, a rotating field is produced in the region of the rotor of the resolver. The rotor windings 190 and 191 are disposed by shaft position of the resolver such that the phase of the signal from which rotor winding through lines 173 and 174 is a function of the angular position of the rotor within the rotating field produced by the stator windings excited by the quadrature signals from source 10 through network 11 and terminals 186 and 187. Accordingly, the terrain slope direction signal in line 174 is a phase reference signal containing information concerning the position of the shaft of the resolver 172. Accordingly also, the terrain slope magnitude signal from line 174 when multiplied against the slope phase information in direction control signal from line 110 in multiplier 176 provides a direct current phase error signal in line 192 which will be zero in value when the phase relationship between the TSD signal 174 and the slope phase signal 110 are in quadrature. Signal 174 will have a maximum positive value when the signals are in phase or are of zero phase difference and will have a maximum negative value when the signals are in antiphase or have 180° phase difference. It is this phase error signal which drives the motor 179.

The system therefore seeks to maintain a quadrature relationship between the signals in lines 174 and 110 thereby achieving a shaft position in the rotor of resolver 172 corresponding to the azimuth of the slope represented by the phase of the slope phase or direction control signal from line 110. Accordingly, the shaft position of the rotor of resolver 161 being a function of slope azimuth enables a distribution of drive velocity signal from line 127 (163) and X parallax or X coordinate drive signal from line 113.

As before described, the rotor position of resolver 161 will effect the desired distribution of the signals according to the cos and sin functions referred to and mutually at right angles whereby the same may be utilized for directing the motion of the cathode ray tube in coordinate directions at right angles (FIGURE 4), as for example, X and Y coordinate directions. When combined in motion applied to the cathode ray tube, this effects a continuous motion thereof in a direction tracing the contour line detected by continuous resolution of this system to remove parallax at right angles to the line of trace.

Once the resolver rotors are synchronized to achieve the operation described (by adjusting the relative position of the rotors thereof during construction), the system will continue in subsequent operation with the proper signal distribution. Relative synchronism of the resolver rotor achieves full value simultaneously of the cos and sin signal distribution functions.

Since signal from line 110 is maintained in quadrature with TSD signal from line 174 by the connections in the slope analyser 171 and since TSM signal from line 173 is in quadrature with the TSD signal from line 174 by virtue of the geometric relationship of windings 190 and 191 of resolver 172, then TSM signal from line 173 will be at all times in phase with the phase slope information or direction control signal from line 110. Accordingly, the output from multiplier 175 obtained from line 193 is directly proportional to the amplitude of signal from line 110 since the TSM signal from line 173 is constant. Observe that in operation the system in positioning the rotors of the resolvers 161 and 172 will cause the signal in line 192 to achieve a null value for which the signal in line 193 is a maximum. The magnitude of the direct current signal from line 193 is therefore proportional to the slope magnitude of the terrain being examined.

The servo positioning device 137 in contouring automatically steps the cathode ray tube to a new elevation on passage of the contour trace off a selected boundary of the stereo image. An operator may cause the cathode ray tube to step to a new elevation upon closing of a trace by actuating manual switch 194 and battery 194a (FIGURE 2). At each new step signal the drive reverse switch 124 causes a reversal in polarity of the trace drive signal in line 127. Note also that constant velocity contouring trace is undesirable generally. It is therefore preferable to close the drive switch 131 for communication of line 123 with terminal 132. Potentiometer 126 controls the average speed of contouring trace.

The influence of the amplitude information in the direction control signal from line 110 is utilized to effect pattern size of the scanning pattern in the cathode ray tube by multiplying the same against the signal line 173 of resolver 172 in multiplier 175. Signal from line 193 carries through junction 195 to be later described, to be added at junction 196 to pattern size control bias signal in line 197 derived from manually adjustable potentiometer 198 served by bias source 199. Line 200 from junction 196 proceeds through the stabilizing and time constant control network 201 for distribution by line 202, 203 and 204 (FIGURE 1) for controlling the gain or level of operation from variable gain amplifiers 18 or 19.

ROUGHNESS ANALYZER

In FIGURE 3 the roughness of the terrain may effect the direction control signal from line 110 where the slope under the scanning pattern is of multiple form. In order to overcome deficiencies which may arise in the control of pattern size with signal from line 193, the latter has added thereto at junction 195 a roughness control signal from line 205 to a degree controllable by manually adjustable potentiometer 206. The roughness signal is derived from the 800 cycle signal available from line 111 which may be a single or plural multiple of the 400 cycle signal from line 110. Roughness analyzer 207 is any suitable form of phase sensitive narrow band filter providing a direct current output through potentiometer 206 of a magnitude responsive to the amplitude of the 800 cycle signal from line 111 and hence the roughness of the terrain. The source 10 is multiplied for reference through multiplier 208 to provide an 800 cycle reference signal in line 209 which is distributed in quadrature through quadrature network 210 to the stator windings 211 and 212 of the resolver 213. One rotor winding 214 of the resolver communicates its output by line 215 to multiplier 216 for multiplication with signal from line 11 to obtain a direct current drive signal in line 217 modulating the 400 cycle square wave source 86 in servo modulator 218, the output of which is communicated by line 219 to amplifier 220 to drive the drive motor 221 having its shaft mechanically linked by linkage 222 to drive the rotor 223 of resolver 213, the latter being of the same electrical and mechanical form as resolvers 161 and 172. Accordingly, by virtue of the disposition of rotor windings 213, signal in line 215 through rotation of the rotor of the resolver will be maintained in quadrature with the signal from line 111. This results from signal in line 217 being zero when signals in line 215 and line 111 are in quadrature and being of maximum positive or negative value responsive to zero or 180° phase difference.

The roughness analyzer system is therefore similar to that utilized to develop signal in line 215 as before described. Thus the rotor winding 224 may distribute its output signal 225 through multiplier 226 to be multiplied with signal from line 111, these signals being maintained in zero phase relationship by action of the resolver 213 described whereby the multiplied output signal at potentiometer 206 represents in its magnitude the amplitude of the 800 cycle signal in line 111 and hence the roughness of the terrain being examined. The adding of signal from line 205 at juncture 195 with signal from line 193 causes the scanning pattern to contract in addition to the contraction produced by the signal from line 193. The bias source 199 (FIGURE 2) by virtue of manual control through potentiometer 198 determines the pattern size for a desired magnitude of the signals from lines 193 and 205. Therefore a small applied bias will result in a small scanning pattern for the careful examination of critical slopes. The rougher the terrain the more will be the tendency to utilize a small scanning pattern in the areas of increased roughness. Were it not for the roughness signal, the signal from line 193 would drop in value on ridge peaks and valley bottoms or under conditions of multiple slopes within the scanning pattern and would expand rapidly away from the terrain surface. The signal from line 205 being responsive to terrain roughness prevents this condition by supplying the contraction signal maintaining the scanning pattern at suitable size for the desired definition.

MECHANICAL SYSTEM

(i) Image Alignment Mechanics

The mechanics of application of the system of the invention to conventional optical mechanical plotting instrumentation is relatively straight-forward and involves essentially only the addition of mechanical mounting devices for the electronic sensing devices and motor devices to existing mechanical linkage.

In FIGURES 18 through 28 are disclosed the mechanical modifications and additions to a known plotting instrument manufactured by Ottico Meccanica Italiana, Rome, Italy, and known as the Nistri photo mapper. The Nistri machine embodies known components recognized in any of the conventional plotting instruments and comprises a plotting table 300 (see FIGURE 18) supported by a firm base 301, the latter carrying a superstructure 302 supporting the adjustable stereo arms 303 and 304 adapted to support the stereo images 27 and 28 respectively (see FIGURE 4). The conventional Nistri machine embodies the illumination head frames 305 and 306 adapted to project green and red illumination through the lens system (not shown) to an image plane represented by line A at a particular height "h" above the surface 307 of table 300. The viewing platen of the conventional stereoplotter is not shown since the present system and invention substitutes the viewing face 26a of the cathode ray tube 26 (FIGURES 4 and 26) for the same and may be regarded as the viewing platen means.

The first modification of a conventional photo mapper involves substituting for the illuminating means thereof the structure revealed in FIGURE 20 in which like numerals indicate like components of previously referred to figures. Thus the projection axis 36 through the stereo image 28 proceeds through the condenser lens 36 within housing 308 past the dichroic mirror 309 and through the blue filter 310 permitting passage of blue light through the cathode ray tube to the photo electric cell 30 (see also FIGURES 1 and 4). In order to observe the image on the image plane A being the screen surface 26a of the cathode ray tube, an image lamp housing 311 supporting lamp 312 projects light through a filter 313 which may be red or green, as for example red for Scan II and green for Scan I (see also FIGURE 18). The dichroic mirror 309 reflects the red or green light as the case may be through the condenser 36 and the image 28 to the screen surface 26a of the cathode ray tube. The structure diagrammatically illustrated in FIGURE 20 is therefore adapted to replace the conventional light source for each image of a conventional plotting instrument.

As revealed in more detail in FIGURES 19 and 21 to 24, the stereo image supporting frames 303 and 304 are adapted for manual adjustment on a conventional plotting instrument such as a Nistri machine. In addition, however, it is contemplated according to the present invention to provide for automatic relative orientation of the stereo images.

In order to align the planes of the stereo images on the $\phi$ plane by the $\phi$ motors $\phi_1$ and $\phi_2$ (FIGURES 1 and 4) frame 304 is supported in the rotary gimbal mount 314 carried by the rotatable yoke 315 journalled in the superstructure 302 as at 316. The $\phi_2$ motor 96 embodying a worm drive mechanism 317 as well as a manual adjusting knob 318 is adapted to move the toothed quadrant 319 about axis 320. This will bring the $\omega$ axes into parallelism or coincidence. The energizing of the $\omega$ motor 321 associated with the worm drive mechanism 322 and having a manual drive knob 323 on the motor 321 is revealed in FIGURE 24 in which the quadrant 324 connects to frame 304 causing it controllably to tip to align the $\phi$ axes in the same or parallel planes.

It is intended that only one $\omega$ motor be applied such as to the Scan II portion of the apparatus since in the ideal sense the $\omega$ axis should be coincident through both image planes and the adjusting of one will therefore bring about alignment with respect to the other. In order to avoid confusion at this juncture, it is desirable to point out in effecting rotation of the images about the K axis, such motors such as the $K_2$ motor 325 of FIGURES 21 and 22 in which the motor also carrying the manual knob 326 drives the worm spindle 327 engaging the driven toothed quadrant 328 effecting rotation of frame 304 about the K axes.

(ii) Scanning Head and Coordinate Mechanics

In FIGURE 25 the scanning head or viewing platen means 26a which for purposes of this disclosure is shown as the screen of the cathode ray tube 26 is movable vertically in a Z coordinate direction and horizontally in X and Y coordinate directions on its supporting carriage 329 in turn supported by three wheels 330, 331 and 332 (FIGURE 27) adapted to traverse the surface of a work sheet 333 set on the working surface 334 of the table 300 (FIGURE 18). Carriage 329 is moved in the X coordinate direction by the X bar structure 335 having a reference edge 336 and passing beneath the carriage 329 between the guides 337 and 338 (FIGURE 27). Likewise the carriage 329 is moved in the Y coordinate direction by the Y bar 339 having a reference edge 340 and passing below the carriage between under surfaces of the carriage 329 and upper surfaces of the X bar in the manner revealed in FIGURE 27 and between the guides 341 and 342.

The scanning head carriage 329 being movable in the X and Y coordinate directions by coordinate bars 335 and 339 respectively is adapted to traverse the surface 334 of table 300 within limits defined by the placement of a motion limiting mask 343 as shown in FIGURE 26 formed of an electrical conductor such as a metal foil and connected by a flexible lead 344 to a ground point 345 on the frame 300. In this way any of the wheels 330, 331 or 332 touching the mask 343 will cause the carriage 329 to be grounded to frame 300 thus constituting the boundary limit switch 125 shown in FIGURE 2 but indicated in FIGURE 26 by numeral 343 for the reason that the switching system may be of other form such as well known limit switch devices mechanically actuated by the carriage 329. Obviously the mask device 343 may be separated into one or more conveniently placed patches of electrical conductor material adapted to be grounded to the frame 300.

The X and Y coordinate motion bars 335 and 339 are mounted and actuated in the manner revealed in FIGURE 26 wherein the bar 335 has a reference face or edge 336 movable therewith as a parallel movable rule. Accordingly, the X bar body 346 having end frames 347 and 348 mount pulleys 349, 350 and 351, 352 respectively. Two cables 353 and 354 extend from their anchorages 355 and 356 about pulleys 349 and 350 and guide wheels 357 and 358 to pass about the X drive pulleys 359 and 360 driven by the drive connection or belt 361 extending from pulley 362 of the X drive motor 130 (FIGURE 2, FIGURE 4). Cables 353 and 354 thence extend respectively about the guide pulleys 363, 364 and 365 to X bar pulleys 351 and 352 to anchored spring tensioning devices 366 and 367. Thus the X bar will be maintained parallel by the parallel cable system described as it is moved over the surface 334 of table 300 (FIGURE 18).

Similarly the Y bar 339 having a reference edge 340 embodies end frames 368 and 369 carrying pulleys 370, 371 and 372, 373. Parallel motion cables 374, 375 extend from anchorages 376, 377 respectively about pulleys 370, 371 and the Y drive pulleys 378, 379 driven by the drive connection such as the belt 380 from drive pulley 381 of the Y motor 141. Thence cable 374 passes about idler pulley 382 and Y bar frame pulley 373 to the anchorage spring tensioning device 383. Cable 375 passes from drive pulley 379 thence about idler pulleys 384, 385 to Y bar frame pulley 372 and to the spring type tensioning anchorage device 386. Therefore the Y bar structure 339 may be driven in parallelism over the surface 334 of the table 300 (FIGURE 18).

The scanning head carriage 329 as revealed in FIGURES 25 and 28 carries a vertically movable scanning head structure 387 containing the cathode ray tube 26 having a screen or scanning head 26a supported within a casing 388 by the deflection coil structure 389 fastened by suitable clamps (not shown) to the casing 388. A pair of vertically spaced apart bifurcated support arms 390 and 391 separated by spacer 392 extend from connection as at 393 and 394 on casing 388 laterally about the vertical tube 395 being slidably supported thereon by the outer rollers 396 on arm 390 and the inner rollers 397 on arm 391 (see also FIGURE 25). The scanning head structure 387 is therefore adapted to move vertically in the Z coordinate direction by virtue of motion of the worm spindle 398 supported vertically by bearings 399 and 400 in the tube 395 and engaged by the rotatable positioning pin 401 seated in the groove 402 of the worm helix 403. The pin 401 is rotatably mounted in the bearings 404 and 405 in the case structure 406 rigidly mounted in the spacer 392. Thus manual adjustment of the knob 407 will raise or lower the scanning head structure 387 as may be desired.

Worm spindle 398 is also driven in the manner indicated in FIGURE 29 being a section on the line 29—29 of FIGURE 25. Z motor 114 supported on the carriage 329 embodies a drive pinion 408 meshed with idler 409 in drive connection with the gear 410 on spindle 398. Idler 409 also meshes with gear 411 of the synchro transmitter 143 (see also FIGURE 2).

In FIGURE 25 a casing 412 for the deflection amplifiers 20 and 21 of FIGURE 1 is likewise supported by carriage 329 and on its upper wall supports a universal joint 413 to which a positioning rod 414 is attached and extends upwardly as illustrated in FIGURE 18 to the overhead mechanisms connecting to the latter in conventional manner to maintain the line of sight of the axes 35 and 36 coincident with the vertical Z axis 415 (FIGURE 28) of the scanning head structure 387.

(iii) *Console Control Unit*

The console 416 shown in FIGURE 18 carries the remainder of the electronic and electrical components revealed in FIGURES 1 and 2 and connects by suitable cable 417 to a suitable junction box 418 supported by the base 301. The face 419 of the console presents control panels 420 and 421 having a plurality of control buttons revealed in more detail in FIGURE 30.

In FIGURE 30 switch 422 permits the power to be turned on and dial 423 adjusts the illumination of the image by the lamps 312 (FIGURES 19 and 20). The upper panel 420 carries a series of control buttons for selection of mode. Button 424 actuates the gang switches 117 to 120 for circuit connection through terminals 117a, 128, 139 and 115. Actuation of switch 425 actuates the same gang switches for circuit through 117b; 128a, 139a and 115a thereby permitting profiling in the Y coordinate direction. Contouring is accomplished by actuating the control button 426 thereby connecting the electrical switches 117 through 120 of FIGURE 2 respectively to the contacts 117c, 167, 168 and 115b. Control button 427 enables all electrical motors to be disconnected providing for manual operation. Control button 428 is a stand by switch. A step counter 429 records the number of steps in contouring or profiling. The control 430 is for control of signals to the K motors. Control knob 431 controls signals to the φ motors and control lever 432 controls signals to the ω motors. Switch 433 controls the step direction and has an intermediate "off" position. Control 434 adjusts the drive velocity potentiometer 126 of FIGURE 2. Depressible pressure switch 435 effectively comprises the drive reversal switch 124 of FIGURE 2.

In addition panel 420a provides a series of button switches 88 to 92 of FIGURE 1 controlling the K, φ and ω motors. As revealed in FIGURE 25 depressible button switch 436 represents drive reverse switch 124 (FIGURE 2). Also switch 445 disconnects the deflection signals revealing a sighting dot on the scanning axis. In addition switch 436b disconnects illuminating lamps 312 (FIGURE 20).

(iv) *Automatic Contouring Mechanism*

Referring further to FIGURE 25 there is revealed a map surface upon which contours may be drawn by the stylus structure 437 the latter being of conventional form and being supported by suitable bracket 438 on the scanning head 329. This stylus is used for contouring operations such as in drawing the series of contouring lines 439, 440.

(v) *Automatic Profiling Mechanism*

In profiling operations the stylus 441 shown in chain lines in FIGURE 25 may be supported by the roller guide structure 442, 443 of frame 329. The stylus is disposed on a 45° axis of inclination 444 with respect to the table surface 333, the said stylus and axis 444 being parallel to one of the reference edges 336 or 340. Alternatively, profiles may be read in a profile recorder 151 in the manner discussed with reference to FIGURE 2.

OPERATION

A stereo perception system, human or machine, performs the sensing operation of relating corresponding points in two similar images. Usually a reference mark or optical axis defines a point in one image. Another mark or axis is positioned, by the system, to register with the corresponding point in the other image.

An automatic stereo system senses registration error or parallax and reduces it to an acceptably low value by correcting the position of the axes. The sensing of parallax should be independent of the structure of the images, providing there is sufficient detail to permit recognition of corresponding points.

SCANNING

The first step in the electronic process is to translate each image into electrical signals. This is done by scanning the images with a moving spot of light, small enough to resolve the finest detail. Fluctuations in the light transmitted by image detail are detected by photo-electric cells.

FIGURE 4 illustrates scanning applied to two photographic transparencies. The spot of light is produced by the electron beam of the cathode ray tube striking the fluorescent screen on the end of the tube. The spot moves from its normal central position in response to voltages applied to external deflection coils. Separate deflection coils independently control the spot in perpendicular X and Y coordinate directions on the screen. Objective lenses project the scanning spot on to each photograph, and the density of image detail determines the amount of light reaching the photo-cells at any instant. As the spot scans the images, separate electrical signals are thereby generated for each image.

Projection plotters provide an optical arrangement similar to that of FIGURE 4. The cathode ray tube replaces the viewing platen of the plotter, and the photo-cells replace the illumination lamps.

For viewing the model, an "anaglyph" image is projected on to the face of the cathode ray tube by the optical system illustrated in FIGURE 20. The dichroic mirror reflects red or green viewing light from the lamp but transmits blue scanning light from the cathode ray tube. Viewing light passes downward through the photographic transparency to form an image on the cathode ray tube face; scanning light passes upward into the photo-cell. The blue filter further isolates the photo-cell from the viewing light.

Unfortunately, the red-green spectacles worn by the operator do not suppress the appearance of the blue scanning pattern completely, and the residual pattern tends to interfere with viewing to some extent. For precise manual positioning, the scanning pattern can be eliminated by depressing a button 445 (FIGURE 25) on the carriage 329. The spot then assumes a position in the centre of the screen, and can be used as a conventional floating mark. Upon releasing the button 445, the spot continues scanning.

NON-PROJECTION PLOTTERS

Non-projection plotting instruments employ separate optical systems for viewing each stereo plate, generally orthographically. It is convenient therefore in applying the invention to these instruments, to use a separate cathode ray tube for scanning each plate. There are other advantages in using separate scanning patterns, even for projection plotters, as discussed under "Model Slope Limitations."

The left and right reference marks, in a non-projection plotting instrument, are "fused" by the operator into a floating mark having both vertical and horizontal position. Likewise the left and right scanning patterns in an non-projection stereo plotter, combine to produce a pattern having vertical and horizontal position. References in this specification to "scanning pattern" apply equally well to the combined pattern of a non-projection stereoplotter.

SIGNAL FLOW

FIGURES 16 and 31 are generalized block diagrams of the complete system, and show the relations between the various functional units for the two basic modes of operation. Most functional units are common to both modes, the differences being in the utilization of the data signals from the correlation unit.

The scanning generator supplies deflection voltages to the coils and reference signals to the correlation unit. The reference signals indicate the components of scanning velocity in the X and Y directions at any instant.

Image signals from the two photo-cells are processed by the correlation unit and translated into five separate data signals.
 (1) Tracing drive signal (FIGURES 1 and 2, lines 133, 127).
 (2) X parallax signal (X coordinate signal line 83, FIGURE 1).
 (3) Y parallax signal (Y coordinate signal line 82, FIGURE 1).
 (4) Terrain slope magnitude signal (FIGURE 2, line 173).
 (5) Terrain slope direction signal (FIGURE 2, line 174).

The terrain slope magnitude signal is fed back to the scanning generator to control the size of the scanning pattern. The remaining data signals direct the mechanical motion required to orient, contour or profile the model.

CORRELATION UNIT—FIGURE 32

Signals from the photo-cells are processed by:
 (1) A multiplying correlator 103 to give a tracing velocity signal (133, 127, FIGURE 2).
 (1) A registration discriminator 39 to give a registration error signal.

The registration error signal is processed by the parallax analyzer 81 to give coherent X and Y coordinate eror (parallax) signals (82, 83).

A portion of the X parallax signal is processed in the slope analyzer 127 to give two signals:
 (1) A shaft position representing terrain slope for contour steering (174).
 (2) A voltage representing terrain slope magnitude used to control size of the scanning pattern (173 as at 196, FIGURE 2).

SLOPE ANALYSER—FIGURE 33

The slope analyzer (171, FIGURE 2) uses the X parallax signal to evaluate the magnitude and direction of terrain slope. To facilitate detection, a circular motion is superimposed on the random motion of the scanning spot as described under Scanning Generator. On sloping terrain, the circular motion of the pattern produces a periodic fluctuation in the X parallax signal as the pattern centre orbits alternatively above and below the terrain surface. The amplitude of this fluctuation indicates the magnitude of terrain slope. The time phase of the fluctuation with respect to the circular scan, indicates the direction or azimuth slope.

In addition to the periodic fluctuation representing the terrain slope, random fluctuations, resulting from quantum noise and other disturbances, are also present in the output of the X parallax multiplier 75. Referring to FIGURE 33, the filter 108 passes the periodic fluctuation freely while suppressing to some extent the random fluctuations. Two multiplying correlators 175 and 176 extract the slope signal from the remaining random noise.

The terrain slope direction (TSD) signal is derived from the phase of the X coordinate (parallax) signal. Multiplying correlator 176 is used as a phase detector for this purpose. The output of the correlator is amplified and applied to the servo motor 179 which rotates the shaft of the phase shifting resolver 172. The resolver shifts the phase of the circular scan signal at a rate of 1° of phase shift for 1° of shaft rotation. The resultant TSD signal is applied to the reference input of multiplier 176. Any change in the direction of the terrain slope changes the time phase of the slope signal. This in turn activates the motor to drive the resolver to the new position required for phase quadrature. The position of the shaft of the phase-shifting resolver 172 is therefore dependent on the direction of the terrain slope and is the required terrain slope direction signal.

The motor 179 resolver 172 assembly is called the slope servo. The shaft of the phase-shifting resolver is coupled to the shaft of the steering resolver (FIGURE 31) and once the steering direction is properly established, the action of the slope servo adjusts the angle of the steering resolver to accommodate changes in slope direction.

The terrain slope magnitude (TSM) signal is derived from the amplitude of the X coordinate (parallax) signal. Multiplying correlator 175 extracts the slope signal from the noise. The reference input to correlator 175 is the reference for correlator 176 shifted in phase by 90°. The reference input is thereby maintained in phase with the X coordinate signal and the D.C. output of correlator 175 is a measure of the terrain slope magnitude, regardless of the direction of slope, and is therefore the required terrain slope magnitude signal.

PARALLAX SENSING

The correlation circuits sense parallax by detecting time differences between the signals from corresponding parts of each image and the signals are limited sharply to eliminate amplitude variation. The operation is thereby rendered insensitive to changes in either average density or contrast of the stereo plates.

To senses parallax by time differences, the spot scanning the images must have a component of motion in the direction of parallax; otherwise no time difference is produced. Since the direction of parallax may not be known, the spot should scan the images in various directions to explore all possibilities. Various scanning patterns have been proposed from time to time for stereo sensing. The random pattern was devised for the following reasons:

(1) The images are scanned in all directions.

(2) The irregular and constantly changing pattern does not react with image configurations such as lines, circles, etc., to produce spurious data signals.

(3) The velocity of the spot varies over wide limits, thereby emphasizing fine and coarse image detail alternatively.

(4) A random pattern is relatively easy to produce electronically by means of amplified "transistor noise."

RELATIVE ORIENTATION—FIGURE 16

Separate motors are provided for the K, φ and ω axes of the two projectors, and the amplified L coordinate (parallax) signals 87a is applied to the orientation motors through separate push-button switches. The operator moves the cathode ray tube carriage to one of the "parallaxing stations" and presses the button (FIGURE 30) energizing the motor appropriate to that station. The motor causes the projector structures, i.e., the images and their supports and associated electronic and optical gear, FIGURE 4, 19 to 24, to rotate about the required axis so as to reduce parallax, the action ceasing when the parallax signal is no longer great enough to drive the motor. The operator repeats this procedure at each of the parallaxing stations in order, selecting the appropriate motor in each case.

The X coordinate (parallax) signal operates the Z servo motor during relative orientation thus removing the X parallax by a vertical motion of the cathode ray tube. The Z motor 114 maintains the pattern centre in contact with the model surface, as the operator moves the cathode ray tube carriage horizontally in the model area. The pattern centre, during automatic operation, is the equivalent of the floating mark during manual operation. X parallax is removed by a vertical motion of the cathode ray tube also during "absolute orientation" and during the plotting of planimetry. The operator is thereby relieved of the necessity of keeping the floating mark on the ground.

TOPOGRAPHIC PLOTTING

The system of the invention plots topography automatically, either by profiling or by contouring. Image and terrain conditions automatically control the speed at which the profiles or contours are traced.

Contouring is the traditional method of plotting topography, and offers the great advantage related to the planimetry. Unfortunately, fully automatic contouring of an entire model is difficult. The invention automatically traces out individual contour lines rapidly but additional means are required to ensure that none of the contours has been missed. Contouring is fundamentally a more complex operation than profiling, and involves additional circuitry described for steering the floating mark.

Profiling automatically covers the entire model, but is wasteful of time since much of the profile data is redundant in the flatter areas. The chief objection to profiling as a topographic plotting method however, is the difficulty of storing and presenting the profile data and of relating it to the planimetry.

Automatic profiling is useful for area and volume measurements. Since the data is not used directly it may be processed by a computer to yield the required answers in numerical form. Signals from terminals 145, 146 and 147 may be processed by conventional computer and/or recording techniques.

The contouring and profiling speed is controlled by the tracing-velocity signal derived from the two image signals by means of a multiplying correlator. The tracing velocity is thereby dependent on the degree of image correlation at any instant, and any factor that reduces image correlation reduces tracing velocity.

Parallax reduces correlation. If the servos are unable to clear X parallax during rapid profile or contour tracing because of dynamic limitations, the reduced correlation will decrease the tracing velocity. By this means, the smoother areas of the model can be traced rapidly, the velocity reducing automatically to accommodate the rougher areas.

Tracing velocity will drop to zero in the absence of image correlation. Thus, the cathode ray tube carriage comes to rest in areas devoid of image detail or beyond the limits of the model.

PROFILING—FIGURE 16

The system of the invention includes a horizontal transport system for the cathode ray tube having independent servo-motor drive in the X and Y directions.

To profile automatically in the X direction, the tracing-velocity signal is applied to the X motor, giving a linear motion to the cathode ray tube carriage. As the carriage moves horizontally, the Z motor maintains the pattern centre in contact with the model surface, in response to the X parallax signals. The Y motor forms a part of a positioning servo, that holds the carriage rigidly in the Y direction. The pattern centre is thereby constrained to trace out a straight profile in the X direction. The Y position is selected by an automatic stepping system. When the carriage reaches the edge of the model, the limit switch operates. The profiling direction is thereby reversed, and the stepping system is actuated to shift the carriage to a new Y position for the next profile.

By reversing the roles of X and Y transport motors, profiles may be traced in the Y direction.

"Synchro read-out" is provided for X, Y, and Z positions of the carriage. The read-out signals may be coupled to a computer or to an external profile-drawing "coordinatograph," as required as for example the recorder 151 (FIGURE 2).

CONTOURING—FIGURE 31

The XY transport system also provides the movements of the carriage necessary for contouring, while the Z motor holds the cathode ray tube rigidly at the required height. The stepping system is used to shift the cathode ray tube vertically to each contour position.

During contouring, X parallax is cleared by horizontal movement of the cathode ray tube. The direction of motion required to clear X parallax is always perpendicular to the direction of motion required for tracing the contour. Since a contour may assume any angle in the XY plane, the slope analyzer 171 is required to direct the X parallax and the tracing-velocity signals in signal distributor 161a (FIGURE 17) to appropriate transport servo motors 130 and 141.

A distributor of the kind referred to herein may be a variable transformer resolver with two inputs, A and B, and two outputs, C and D. The angle of the resolver shaft determines how the input signals are distributed between the output terminals. For example, if output C were $A \sin \theta + B \cos \theta$, then output D would be $$A \cos \theta + B \sin \theta.$$

When contouring, the tracing-velocity signal is applied to one input of the steering resolver. The resolver distributes the tracing signal to the X and Y transport servo motors in such a manner that the resulting motion of the carriage is tangential to the slope, i.e., along a contour line. The X parallax signal is applied to the other input of the steering resolver 172. The resolver distributes the X parallax signal in such a manner that the resulting motion of the carriage is always perpendicular to, and directly towards, the contour line, thereby maintaining the pattern centre in contact with the terrain at the required height. As the pattern centre traces out a contour, the slope analyzer 171 constantly adjusts the angle of the steering-resolver shaft 181 as required by the changing direction of slope.

PLOTTING OF DRAINAGE

The system of the invention can plot drainage automatically by a modification of the contouring mode (FIGURE 31). For this purpose the tracing signal is applied to the Z servo in such a manner that the cathode ray tube assembly is driven slowly downward. Contact with the model surface is maintained by a lateral movement of the cathode ray tube in response to the X parallax signal, as in contouring. It can be shown that, under these conditions, the pattern centre follows the paths of steepest descent, which are the drainage lines.

As in contouring, the plotting of drainage is not completely automatic unless additional means are employed to ensure that no drainage paths have been missed.

PATTERN SIZE

The size of the scanning pattern is subject to conflicting requirements. On the one hand, a small pattern is desired to resolve small topographic structures and to reduce "averaging" errors on curved surfaces. On the other hand, a smaller pattern senses less image information thus impairing the reliability of parallax detection, and making the determination of slope particularly difficult in flatter areas of the model. For this reason, pattern size is not fixed but is automatically adjusted in accordance with the nature of the terrain.

The terrain slope magnitude signal from the correlation unit is used to control pattern size, as shown in FIGURES 1, 2, 16 and 31. An increase in terrain slope magnitude produces a decrease in pattern size. This reciprocal relationship between pattern size and terrain slope leads to a constant height difference across the pattern with the following results.

Under flat conditions, where resolution and averaging errors are not significant, the pattern expands facilitating slope detection. Under conditions of severe slope or rough terrain, where slope detection is not a problem, the pattern contracts, satisfying the resolution requirement and minimizing "averaging" errors.

PLANIMETRIC PLOTTING

The plotting of planimetry is much more interpretive by nature than the plotting of topography and is therefore more difficult to automate. The invention assists in the plotting of planimetry by maintaining the pattern centre in accurate contact with the model surface, thereby relieving the operator of the necessity of making continuous vertical adjustments as he traces out the features. In rough country, this assistance may reduce plotting time by perhaps 30 percent and is, therefore, a partial solution to the problem.

ORTHO-PHOTOGRAPHY

Ortho-photography is photography corrected for scale differences arising out of terrain relief, and camera angle at the moment of exposure. The resultant photo-map may be used as a substitute for drawn planimetry for many purposes, and has both the advantage and disadvantage of retaining all of the planimetric detail available in the original photographs. In applications where the abridgement and delineation of drawn planimetry are desirable, the photo-map may be used as the source material. The drafting of features may then be done with conventional drafting and tracing tools, thereby freeing the stereo-plotting instrument for automatic operations.

The invention may produce ortho-photography directly by means of a printing cathode ray tube attached to the carriage. The action is as follows:

The amplified signal from one of the photo-cells is applied to the printing cathode ray tube so as to modulate the light output. The deflection coils of the printing cathode ray tube are excited by the scanning generator so that the spot of light follows the same pattern as that on the main cathode ray tube. By this means an image of the terrain is produced on the face of the printing cathode ray tube and a lens system projects this on to a sheet of sensitive paper. Exposing the sheet, while profiling the model, gives the scale correction required for ortho-photography.

PERFORMANCE FACTORS

Three performance criteria for an automatic plotting system are: speed, accuracy, and fallibility. Speed and accuracy are generally expressed in numerical terms, and fallibility could be expressed as the fraction of the average model area that the system will fail to plot automatically.

Accuracy in turn can be divided into static accuracy and dynamic accuracy. Static accuracy refers to the system at rest, and is primarily a function of the parallax sensing operation. Dynamic accuracy refers to the additional errors that are introduced as the result of the motion during profile or contour tracing.

Plotting speed and accuracy are interdependent when practising the system of the invention and increased speed can always be obtained at the expense of record smoothness and accuracy. For a given accuracy, however, the plotting speed is limited fundamentally by the rate at which information is extracted from the stereo photographs. Scanning the images at higher speed increases the information rate, but also raises the frequency of the image signals, thus increasing the difficulty of separating them from the spurious "quantum noise" signal also present in the output from the photo-cells.

Quantum noise refers to irregularities in the image signal owing to the corpuscular or quantized nature of light. At very low-light levels the rate at which light quanta or photons reach the photo-cells may be low enough for them to register individually. The resulting roughness in the output signals tends to obscure the image signals, and to introduce irregularities in the data signals from the correlation circuits. These irregularities are transferred to the profile or contour records, and produce an erratic jiggling or oscillating of the coordinate motors.

Increasing the amount of light reaching the photo-cells reduces quantum noise, and therefore allows a higher scanning velocity to be usefully employed. There are physical limits to the brilliance of the scanning spot however, and in the system of the invention these limits are approached closely. Optical aperture is, therefore, a factor governing the light available for scanning and, indirectly, plotting speed. Projection plotters require a small aperture in order to achieve a useful depth of field. Non-projection plotters are free from the limitation.

A less fundamental, but very practical, limit to plotting speed results from inertia of the carriage and other parts that move during plotting. Inertia increases the size and expense of servo-mechanisms, and also governs the magnitude of the acceleration forces to which the machine is subjected during rapid plotting, and which cause vibration and loss of adjustment. Model size is the most serious factor affecting inertia, since it controls the size and weight of the carriage assembly, and also the distance through which it moves. Inertia varies between the third and fifth power of the linear dimensions of the model, depending on the type of instrument, and is therefore greatly reduced by plotting at reduced scale.

The Helava Analytical Plotter as described in "Analytical Plotter in Photogrammetric Production Line," Helava, U. V., Photogrammetric Engineering, volume XXIV 794 (1958), appears to satisfy the basic optical and inertial requirements for a fast automatic machine. The optical system is simple, and facilitates the use of large aperture. Plotting is at photo scale, and the orientation adjustments are made on the computer, where they are not subject to the disturbing effects of vibration and stress. The speed potential of such a combination suggests a contour or profile tracing speed about one hundred times that of a human operator.

STATIC ACCURACY

The static accuracy of an automatic stereo system can be no better than the precision of the plotting instrument to which it is attached. Automatic stereo may introduce additional errors however, and their magnitude will depend upon the precision of the parallax sensing and clearing operations.

The precision of parallax sensing is related to the effective resolution of the plotting instrument, including the size of the scanning spot. A spot diameter should be chosen that will not degrade the resolution of the instrument appreciably, bearing in mind that the amount of scanning light available is also related to spot size.

Experience indicates that the system of the invention can clear parallax to about a fifth of the system resolution. When practicing the invention on a projection plotter, parallax is regularly cleared to better than 0.01 millimetre at photo scale.

DYNAMIC ACCURACY

Delays in the smoothing networks necessary to suppress quantum-noise irregularities are the greatest source of dynamic error.

Network characteristics may be chosen in relation to the type of performance required. A short time-constant favours small dynamic error, at the expense of increased "jiggle" and static error. Dynamic and static accuracy can both be improved only by utilizing a stereo instrument with greater optical efficiency.

Contour accuracy is difficult to assess. The invention on a projection plotter traces contours at a speed of about four times that of a stereo operator, with more than 90 percent of the contour lying within 0.5 millimetre of the correct height at model scale.

Profile accuracy appears to be equivalent to contour accuracy in terms of height error. Average profiling speed is 1 or 2 inches per second at model scale.

SPEED AND ACCURACY OF ORIENTATION

About 5 seconds are required to clear the Y parallax at each parallaxing station, and approximately 2 minutes are sufficient to clear all five stations for the first cycle. Relative orientation of an average model is complete in about 5 or 6 minutes, and requires four or five cycles. Initial tests indicate that the system of the invention clears Y parallax more precisely than an operator by a factor of about two. (Blackut, T. J., and Helava, U. V., "Automatic Stereoplotting in Small and Large Scale Mapping," Report to the IXth International Congress of Photogrammetry, London 1960, from National Council of Canada.)

FALLIBILITY

The following conditions affect the ability of the correaltion circuits to sense parallax and develop useful data signals:

(1) Model slope
(2) Height ambiguity
(3) Density of the transparencies.

*Model slope.*—In areas of severe slope, a large part of the horizontal scanning pattern may be so far from the model surface that the resulting X parallax is greater than the correlation circuits can handle. Experience indicates that a model slope in excess of 20 or 30 degrees reduces the performance of the system of the invention considerably. This problem may be overcome generally by providing a separate cathode ray tube for each photograph. By using scanning patterns that are not quite identical the resulting pattern plane is made to assume an angle in space and be tangent to the model surface at all times. The ability of the pattern to resolve small topographic structures is improved since the pattern will tend to conform more closely to the surface of the model.

HEIGHT AMBIGUITY

The performance of the system of the invention may become erratic whenever the model presents more than one surface or level. Height ambiguity is most troublesome during large-scale plotting, when the ambiguity exceeds about 1 percent of the flying height. Partial tree cover is the most common example of this situation, particularly when the trees are not in full leaf, and the ground is visible between the branches. Tall buildings present another example of height ambiguity which is particularly serious when buildings of various heights are clustered together within the area of the scanning pattern.

Deterioration of machine performance from this cause is of two types; (1) height errors introduced by the vertical wandering of the pattern between the limits of the ambiguity; (2) possible failure of the correlation circuits to derive useful data signals.

DENSITY OF TRANSPARENCIES

The plates for use with the invention on projection plotters should be of moderate contrast and of relatively low density, in order to conserve the available point in the image, when averaged over a circular area of 1 millimetre in diameter. The contrast of the plates should be as great as possible, consistent with the above density limit and with the preservation of detail in highlight areas.

Plates for the invention should never be prepared by means of a dodging printer or by an unsharp masking technique, unless special precautions are observed. All dodging processes remove the larger structure from image detail and enhance fine structure and boundary definition. In the numerous areas of an image where fine structure is absent, dodging removes the only information available for stereo perception. Plates may be printed on an electronic dodging printer, if the scanning spot that exposes the plate is defocussed to give an effective diameter of about 5 millimetres (about 10 millimetres to the eye). Plates printed on a fluorescent dodging printer, or by an unsharp masking process, require a screen or mask separation of about 1 centimetre. The purpose of these precautions is to confine the dodging action to image detail larger than that which is useful for parallax sensing.

What I claim is:

1. In a stereo image examining system including means for projecting stereo images having X and Y coordinates onto viewing platen means and in which the images are examined point by point by adjusting the intersection of the projection axes with the viewing platen means in a Z coordinate direction to remove parallax, the combination therewith of: means for scanning each of said images about each of said axes simultaneously to develop two image information signals; means for processing said signals to obtain an error signal responsive to parallax in direction and magnitude in plural coordinate directions; means generating plural coordinate drive signals responsive to corresponding functions of said error signal; a plotting table for said system; a carriage traversable on said table and supporting said viewing platen means thereon; coordinate bar mechanism in the form of right angularly disposed slidable bar members slidably engaging said carriage and traversable over said table to provide coordinate motion for said carriage; motor drive means for said bar mechanism responsive to said coordinate drive signals; means vertically moving said viewing platen means in a Z coordinate direction including Z motor means for effecting same; means for energizing said Z motor means responsive to one of said drive signals thus to reduce parallax to zero; and means for selectably energizing said motor drive means for said bar mechanisms and said Z motor of said viewing platen means to effect profiling and contouring functions by said system.

2. In a stereo image examining system including means for projecting stereo images having X and Y coordinates onto viewing platen means and in which the images are examined point by point by adjusting the intersection of the projection axes with the viewing platen means in a Z coordinate direction to remove parallax, the combination therewith of: means for scanning each of said images in all directions about each of said axes simultaneously to develop two image information signals; means for processing said signals to obtain an error signal responsive to parallax in direction and magnitude in coordinate directions; means generating coordinate drive signals responsive to corresponding functions of said error signal; a plotting table for said system; a carriage traversable on said table and supporting said viewing platen means thereon; coordinate bar mechanism in the form of right angularly disposed slidable bar members slidably engaging said carriage and traversable over said table to provide coordinate motion for said carriage; and motor drive means for said bar mechanism responsive to said coordinate drive signals.

3. In a stereo image examining system including means for projecting stereo images having X and Y coordinates onto viewing platen means and in which the images are examined point by point adjusting the intersection of the projection axes with the viewing platen means in a Z coordinate direction to remove parallax, the combination therewith of: means for scanning each of said images in all directions about each of said axes simultaneously to develop two image information signals; means for processing said signals to obtain an error signal responsive to parallax in direction and magnitude in coordinate directions; means generating coordinate drive signals responsive to corresponding functions of said error signal; a plotting table for said system; a carriage traversable on said table and supporting said viewing platen means thereon; coordinate bar mechanism in the form of right angularly disposed slidable bar members slidably engaging said carriage and traversable over said table to provide coordinate motion for said carriage; motor drive means for said bar mechanism responsive to said coordinate drive signals; means vertically moving said viewing platen means in a Z coordinate direction including Z motor means for effecting same; means for energizing said Z motor means responsive to one of said drive signals thus to reduce parallax to zero; means for selectably energizing said motor drive means for one of said bar mechanisms and said Z motor of said viewing platen means to effect profiling and contouring functions by said system; and means for recording X, Y and Z coordinate functions of said error signal.

4. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means and including a noise generator and a fixed frequency source providing a random scanning pattern for effectively examining each of said images at said viewing platen means; a photo-electric cell associated with each image and including an optical system defining a scanning axis in registration therewith and extending thereto from said scanning pattern generated at said viewing platen means, each photo-electric cell generating an electrical signal responsive to the image information traversed in its associated image by said scanning pattern; a registration discriminator providing a registration error signal responsive to parallax and the direction of parallax relative to X and Y coordinate functions of the difference in information scanned in said images by said scanning patterns; and means for generating X and Y coordinate drive signals responsive to coordinate functions of said error signal.

5. An automatic stereographic image information contour plotting system comprising: means supporting a stereographic image pair in respective image planes, each of said images embodying corresponding X, Y and Z coordinate reference axes relative to the image information therein; optical-electronic random scanning means generating an information signal for each image responsive to simultaneous scanning about a scanning axis of image information contained in said images; a registration discriminator providing a registration error signal containing amplitude and terrain slope direction phase information responsive to time differences of information in said information signals; a parallax analyzer generating X and Y parallax signals responsive to X and Y parallax information in said registration error signal; a tracing motion drive velocity signal generator; a multiplying correlator generating a tracing motion drive velocity signal responsive to said information signals; a slope analyzer generating a terrain slope direction signal responsive to phase information signal; and a signal distributor combining said X coordinate error signal and said tracing velocity signal with said terrain slope direction signal in quadrature to provide X and Y drive motion signals having a directional resultant parallel to the contour being traced and a motion component responsive to parallax at right angles thereto in a direction toward the contour being traced.

6. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means and including a noise generator and a fixed frequency source providing a random circular scanning pattern for effectively examining each of said images at said viewing platen means; a photo-electric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator providing a registration error signal responsive to parallax and the direction of parallax relative to X and Y coordinate functions of the difference in information scanned in said images by said scanning patterns; and means for dividing said registration error signal into X and Y coordinate components.

7. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means and including a noise generator and a fixed frequency source providing a random circular scanning pattern for effectively examining each of said images at said viewing platen means; a photo-electric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator cross-correlating said electrical signals and providing a registration error signal responsive to parallax and the direction of parallax relative to X and Y coordinate functions of the difference in information scanned in said images by said scanning patterns; and means for dividing said registration error signal into X and Y coordinate components.

8. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means providing a random circular scanning pattern for effectively examining each of said images at said viewing platen means; a photoelectric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator providing a registration error signal responsive to parallax and the direction of parallax relative to X and Y coordinate functions of the difference in information scanned in said images by said scanning patterns; means for dividing said registration error signal into X and Y cordinate components; and means generating X and Y coordinate drive signals responsive to said components.

9. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means providing a random circular scanning pattern for effectively examining each of said images at said viewing platen means; a photo-electric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator cross-correlating said electrical signals and providing a registration error signal responsive to parallax and the direction of parallax relative to X and Y coordinate functions of the difference in information scanned in said images by said scanning pattern; means for dividing said registration error signal into X and Y coordinate components; and means generating X and Y coordinate drive signals responsive to said components.

10. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means providing a random circular scanning pattern for effectively examining each of said images at said viewing platen means; a photo-electric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator multiplying and cross-correlating said electrical signals and providing a registration error signal responsive to parallax and the direction of parallax relative to X and Y coordinate functions of the difference in information scanned in said images by said scanning patterns; means for dividing said registration error signal into X and Y coordinate components; and means generating X and Y coordinate drive signals responsive to said components.

11. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means and including a noise generator and a fixed frequency source providing a random circular scanning pattern for effectively examining each of said images at said viewing platen means; a photo-electric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator cross-correlating said electrical signals and providing a registration error signal responsive to parallax and the direction of parallax relative to X and Y coordinate functions of the difference in information scanned in said images by said scanning patterns; means for dividing said registration error signal into X and Y coordinate components; and means generating X and Y coordinate drive signals responsive to said components.

12. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means and including a noise generator and a fixed frequency source providing a random circular scanning pattern for effectively examining each of said images at said viewing platen means; a photo-electric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator multiplying and cross-correlating said electrical signals and providing a registration error signal responsive to parallax and the direction of parallax relative to X and Y coordinate functions of the difference in information scanned in said images by said scanning patterns; means for dividing said registration error signal into X and Y coordinate components; and means generating X and Y coordinate drive signals responsive to said components.

13. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means providing a random circular scanning pattern for effectively examining each of said images at said viewing platen means; a photo-electric cell associated with each image and including an optical system defining a scanning axis in registration therewith and extending from said scanning pattern generated at said viewing platen means; each photo-electric cell generating an electrical signal responsive to the image information traversed in its associated image by said scanning pattern; a registration discriminator multiplying and cross-correlating said electrical signals and providing a registration error signal responsive to parallax and the direction of parallax relative to X and Y coordinate functions of the difference in information scanned in said images by said scanning patterns; means for dividing said registration error signal into X and Y coordinate components; means generating X and Y coordinate drive signals responsive to said components; plotting mechanism traversable over said table; and means for moving said plotting mechanism responsive to said X and Y coordinate drive signals.

14. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means and including a noise generator and a fixed frequency source providing a scanning pattern for effectively examining each of said images at said viewing platen means; a photo-electric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator cross-correlating said electrical signals and providing a registration error signal responsive to parallax and the direction of parallax relative to X and Y coordinate functions of the difference in information scanned in said images by said scanning patterns; means for dividing said registration error signal into X and Y coordinate components; means generating X and Y coordinate drive signals responsive to said components; plotting mechanism traversable over said table; and means for moving said plotting mechanism responsive to said X and Y coordinate drive signals.

15. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means and including a noise generator and a fixed frequency source providing a random circular scanning pattern for effectively examining each of said images at said viewing platen means; a photo-electric cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator cross-correlating said electrical signals and providing a registration error signal responsive to parallax and the direction of parallax relative to X and Y coordinate functions of the difference in information scanned in said images by said scanning patterns; means for dividing said registration error signal into X and Y coordinate components; means generating X and Y coordinate drive signals responsive to said components; plotting mechanism traversable over said table; and means for moving said plotting mechanism responsive to said X and Y coordinate drive signals.

16. In a stereoplotting system in which two stereo images are examined and interpreted with the aid of viewing platen means, the combination therewith of: cathode ray tube means for generating a screen scanning pattern for each of said images and serving as the viewing platen means therefor; a scanning generator for said cathode ray tube means and including a noise generator and a fixed frequency source providing a random circular scanning pattern for effectively examining each of said images at said viewing platen means; a photo-electrical cell associated with each image and including an optical system defining a scanning axis in registration therewith and extending from said scanning pattern generated at said viewing platen means, each photo-electric cell generating an electrical signal responsive to the image information traversed in its associated image by said scanning pattern; a registration discriminator multiplying and cross-correlating said electrical signals and providing a registration error signal responsive to parallax and the direction of parallax relative to X and Y coordinate functions of the difference in information scanned in said images by said scanning patterns; means for dividing said registration error signal into X and Y coordinate components; means generating X and Y coordinate drive signals responsive to said components; plotting mechanism traversable over said table; and means for moving said plotting mechanism responsive to said X and Y coordinate drive signals.

17. In a stereo image examining system including means for projecting stereo images having X and Y coordinates onto viewing platen means and in which the images are examined point by point by adjusting the intersection of the projection axes with the viewing platen means to remove parallax, the combination therewith of: means supporting each of said images rotatably on respective K, phi and omega axes; means for rotatably adjusting said support means about said axes including motors for rotating said support means about at least one each of said K, phi and omega axes; and means for selectively energizing said motors responsive to parallax in the direction of one of said coordinates to establish relative orientation of said images.

18. In a stereo image examining system including means for projecting stereo images having X and Y coordinates onto viewing platen means and in which the images are examined point by point by adjusting the intersection of the projection axes with the viewing platen means to remove parallax, the combination therewith of: means supporting each of said images rotatably on respective K, phi and omega axes; means for rotatably adjusting said support means about said axes including motors for rotating said support means about at least one each of said K, phi and omega axes; means for selectively energizing said motors responsive to parallax in the direction of one of said coordinates to establish relative orientation of said images; electronic scanning means simultaneously scanning said images and providing an error signal responsive to parallax in the direction of one of said coordinates; means generating a motor drive signal responsive to said error signal; and means for selectively energizing said motors with said drive signal thereby substantially to overcome visual inspection during orientation of said images.

19. In a stereo image examining system including means for projecting stereo images having X and Y coordinates onto viewing platen means and in which the images are examined point by point by adjusting the intersection of the projection axes with the viewing platen means to remove parallax, the combination therewith of: means supporting each of said images rotatably on respective K, phi and omega axes; means for rotatably adjusting said support means about said axes including energizing drive means for said support means about at least one each of said K, phi and omega axes; means for selectively energizing said drive means responsive to parallax in the Y coordinate direction; and means for recording X, Y and Z coordinate functions of said error signal.

References Cited in the file of this patent

UNITED STATES PATENTS

| | | |
|---|---|---|
| 2,283,226 | Porter | May 19, 1942 |
| 2,492,870 | Kelsh | Dec. 27, 1949 |
| 2,703,150 | Rieber | Mar. 1, 1955 |
| 2,859,521 | Cook | Nov. 11, 1958 |
| 2,964,643 | Hobrough | Dec. 13, 1960 |
| 2,964,644 | Hobrough | Dec. 13, 1960 |
| 3,004,464 | Leighton | Oct. 17, 1961 |